(12) United States Patent
Nakamura et al.

(10) Patent No.: US 9,502,848 B2
(45) Date of Patent: Nov. 22, 2016

(54) IDLE STOP CONTROL DEVICE

(75) Inventors: Koin Nakamura, Isehara (JP); Satoru Okuma, Machida (JP); Fumihiko Imamura, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 361 days.

(21) Appl. No.: 13/985,777

(22) PCT Filed: Jan. 25, 2012

(86) PCT No.: PCT/JP2012/051498
§ 371 (c)(1),
(2), (4) Date: Sep. 5, 2013

(87) PCT Pub. No.: WO2012/111394
PCT Pub. Date: Aug. 23, 2012

(65) Prior Publication Data
US 2013/0338908 A1 Dec. 19, 2013

(30) Foreign Application Priority Data
Feb. 16, 2011 (JP) .................................. 2011-030469

(51) Int. Cl.
*F02D 45/00* (2006.01)
*H01R 39/58* (2006.01)
(Continued)

(52) U.S. Cl.
CPC ............... *H01R 39/58* (2013.01); *F02D 29/02* (2013.01); *F02D 45/00* (2013.01); *F02N 11/087* (2013.01);
(Continued)

(58) Field of Classification Search
CPC .... F02D 29/02; F02D 45/00; F02N 11/0818; F02N 11/087; F02N 15/023; F02N 15/067; F02N 2200/0801; F02N 2200/14; Y02T 10/48; G01D 3/08; H01R 39/58; G05B 19/4065
USPC ...... 701/113; 417/410.1; 310/239, 252, 248; 702/34; 123/179.4
See application file for complete search history.

(56) References Cited

U.S. PATENT DOCUMENTS 3,612,928 A * 10/1971 Hokky .................. H02K 13/10
310/227
4,316,186 A * 2/1982 Purdy .................... H01R 39/58
310/245
(Continued)

FOREIGN PATENT DOCUMENTS

FR WO 2011161348 A1 * 12/2011 ................ B60L 3/00
JP 62-155744 A 7/1987
(Continued)

*Primary Examiner* — Stephen K Cronin
*Assistant Examiner* — Joshua A Campbell
(74) *Attorney, Agent, or Firm* — Foley & Lardner LLP

(57) ABSTRACT

Disclosed is an idle stop control device that automatically shuts down an engine when a first condition is satisfied, and then restarts the engine using a starter to which electricity is fed through a brush when a second condition is satisfied, the idle stop control device including a start-operation brush wear amount computing unit that is configured to compute a brush wear amount in a single start operation, a total brush wear amount computing unit that is configured to compute a total brush wear amount by integrating the brush wear amount in a single start operation, and an automatic engine shutdown prohibiting unit that is configured to prohibit an automatic engine shutdown when the total brush wear amount is equal to or larger than a warranty driving wear amount of the starter.

5 Claims, 17 Drawing Sheets

(51) Int. Cl.
*F02D 29/02* (2006.01)
*F02N 11/08* (2006.01)
*G05B 19/4065* (2006.01)
*F02N 15/02* (2006.01)
*F02N 15/06* (2006.01)

(52) U.S. Cl.
CPC ......... *F02N 11/0818* (2013.01); *F02N 15/023* (2013.01); *F02N 15/067* (2013.01); *F02N 2200/0801* (2013.01); *F02N 2200/14* (2013.01); *G05B 19/4065* (2013.01); *Y02T 10/48* (2013.01)

(56) References Cited

U.S. PATENT DOCUMENTS

| | | | | |
|---|---|---|---|---|
| 4,334,188 | A | * | 6/1982 | Dudley ................ H01R 39/58 324/133 |
| 5,744,889 | A | * | 4/1998 | Niimi .................... H02K 13/00 310/239 |
| 7,629,723 | B2 | * | 12/2009 | Bollwerk ............. H01R 39/58 310/242 |
| 2004/0174088 | A1 | * | 9/2004 | Inukai ................... H01R 43/12 310/252 |
| 2007/0138899 | A1 | | 6/2007 | Bollwerk et al. |
| 2007/0286747 | A1 | * | 12/2007 | Nagase ................ F02D 41/065 417/410.1 |
| 2013/0197821 | A1 | * | 8/2013 | Maeda ................... H02K 13/00 702/34 |
| 2013/0338908 | A1 | * | 12/2013 | Nakamura ........... F02N 11/087 701/113 |

FOREIGN PATENT DOCUMENTS

| | | | |
|---|---|---|---|
| JP | 6-141513 | A | 5/1994 |
| JP | 09-074721 | A | 3/1997 |
| JP | 2001-065440 | A | 3/2001 |
| JP | 2002-115578 | A | 4/2002 |
| JP | 2005-295704 | A | 10/2005 |
| JP | 2007-166895 | A | 6/2007 |
| JP | 2007166895 | A * | 6/2007 |
| JP | 2007-262935 | A | 10/2007 |
| JP | 2008-291756 | A | 12/2008 |
| JP | 2011-020567 | A | 2/2011 |
| WO | WO 2011161348 | A1 * | 12/2011 |

* cited by examiner

IDLE STOP CONTROL DEVICE

TECHNICAL FIELD

The present invention relates to improvement of an idle stop control device that automatically shuts down an engine when a first condition is satisfied and then restarts the engine using a starter when a second condition is satisfied.

BACKGROUND ART

There is known a technique of prohibiting an automatic engine shutdown, in which, in a case where a total starter driving count T is equal to or larger than a warranty driving count of the starter, it is determined that the starter may not be normally driven (refer to JP2001-65440A). In this technique, an integral value Cm of the starter driving count in a manual start operation and an integral value Ca of the starter driving count in an automatic start operation are independently obtained, and a load ratio $\alpha:\beta$ is introduced in consideration of a load difference between the manual start operation and the automatic start operation. In addition, the total starter driving count T is computed based on the following equation.

$$T = \alpha \times Cm + \beta \times Ca$$

In this case, a battery voltage and an engine cold state (such as engine water temperature or an outdoor air temperature) are employed as a factor that determines the load ratio $\alpha:\beta$.

SUMMARY OF INVENTION

In the starter to which electricity is fed through a brush, the brush is worn whenever the starter is driven. Therefore, it is necessary to obtain the total starter driving count in consideration of the brush wear amount.

However, the technique disclosed in JP2001-65440A fails to discuss the brush wear amount although it mentions wear caused by meshing a pinion gear with a ring gear as a factor influencing durability deterioration of the starter.

The present invention provides a device capable of reliably performing an automatic engine shutdown/restart operation even when the automatic engine shutdown/restart operation is performed by driving a starter to which electricity is fed through a brush.

According to an aspect of the invention, there is provided an idle stop control device that automatically shuts down an engine when a first condition is satisfied, and then restarts the engine using a starter to which electricity is fed through a brush when a second condition is satisfied. The idle stop control device includes: a start-operation brush wear amount computing unit that computes a brush wear amount in a single start operation; a total brush wear amount computing unit that computes a total brush wear amount by integrating the brush wear amount in a single start operation; and an automatic engine shutdown prohibiting unit that prohibits an automatic engine shutdown when the total brush wear amount is equal to or larger than a warranty driving wear amount of the starter.

BRIEF DESCRIPTION OF DRAWINGS

The foregoing and additional features and characteristics of this disclosure will become more apparent from the following detailed description considered with the reference to the accompanying drawings, wherein.

DESCRIPTION OF EMBODIMENTS

First Embodiment

Figure 1:
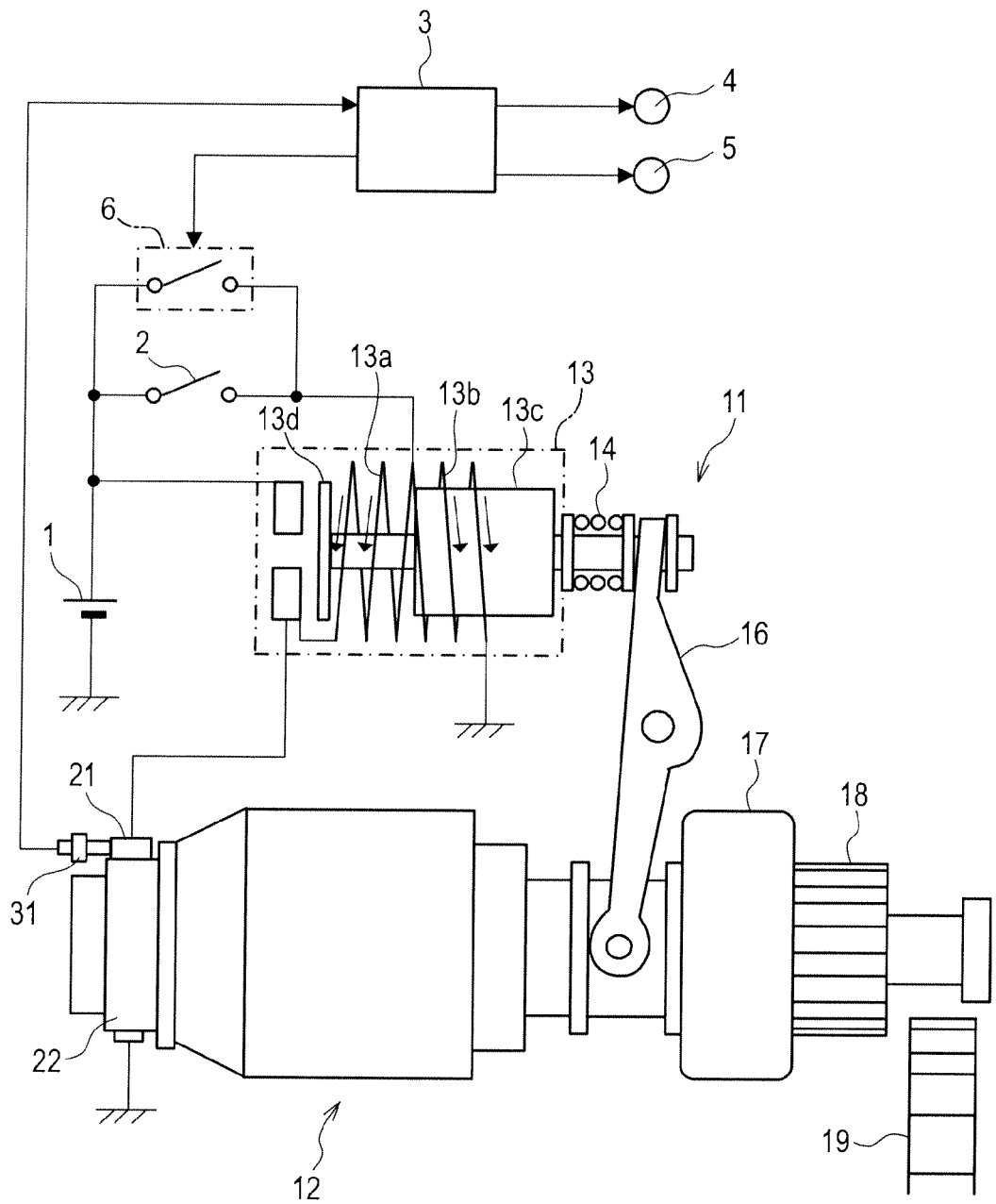
FIG. 1 is a schematic diagram illustrating an idle stop control device according to a first embodiment.

FIG. 1 is a schematic diagram illustrating an idle stop control device according to a first embodiment of the invention. This idle stop control device is mounted on a vehicle (not illustrated).

Referring to FIG. 1, the starter 11 has a magnet switch 13 for performing engagement/release between a motor 12 and an engine side. The magnet switch 13 shifts an overrunning clutch 17 to the left or right side of FIG. 1 using a shift lever 16. In this case, if the overrunning clutch 17 is pushed to the right side of FIG. 1, the pinion gear 18 meshes with the ring gear 19 so that the driving power of the motor 12 is transmitted to the ring gear 19 (engine side).

Specifically, the magnet switch 13 has an attraction coil 13a and a holding coil 13b. As the starter switch 2 is turned on, an electric current flows from the battery 1 to the attraction coil 13a and the holding coil 13b in an arrow direction. Then, by virtue of the attraction force generated in this case, a plunger 13c is shifted to the left side of FIG. 1 to push the pinion gear 18 through the shift lever 16, so that the pinion gear 18 meshes with the ring gear 19. As a result, as the plunger 13c moves, a main contact 13d of the magnet switch 13 is closed, so that an electric current flows from the battery 1 to the commutator 22 (motor 12) through the brush 21, and the motor 12 is rotated. A torque generated by rotation of the motor 12 is transmitted to the ring gear 19 through the pinion gear 18 to start the engine.

If the starter switch 2 is turned off after the engine start operation, the attraction force of the plunger 13c is released, so that the plunger 13c is returned to its original position by virtue of a biasing force of a return spring 14. Accordingly, the main contact 13d of the magnet switch 13 is opened, and a current flowing to the motor 12 is cut off. At the same time, the pinion gear 18 is released from the ring gear 19.

The engine controller 3 controls fuel supply from a fuel injection valve 4 and an ignition timing of an ignition plug 5 depending on a stepping amount of the accelerator pedal and performs an automatic engine shutdown/restart operation when a predetermined condition is satisfied in order to further improve fuel efficiency. In this automatic engine shutdown/restart operation, the engine controller 3 drives the starter 11 instead of a driver. Therefore, a second starter switch 6 opened at all times is provided in parallel with the starter switch 2. The second starter switch 6 is opened/closed depending on an instruction from the engine controller 3.

In an automatic engine shutdown in a vehicle stop state using the engine controller 3, a fuel is cut off to automatically shut down the engine when an automatic engine shutdown allowance condition (first condition) in a vehicle stop state is satisfied while a vehicle stops after an engine warm-up operation is completed. Then, when an automatic engine shutdown release condition (second condition) in a vehicle stop state is satisfied, the second starter switch 6 is closed to drive the starter 11, and a fuel starts to be supplied to restart the engine while the engine cranking is performed. A fuel is not consumed while the engine is automatically shut down. Therefore, it is possible to improve fuel efficiency. Here, the fuel cut-off refers to an operation of cutting off the fuel supplied from the fuel injection valve 4.

Although not illustrated in detail in FIG. 1, the brush 21 is pressed to the commutator 22 using a spring. As a result, an excellent contact between the brush 21 and the commutator 22 is obtained, so that electricity is efficiently fed from the brush 21 to the commutator 22 even when the commutator 22 is rotated. In the starter 11 to which electricity is fed through the brush 21 in this manner, the brush 21 is slowly worn whenever the starter 11 is driven as the automatic engine shutdown release condition (second condition) in a vehicle stop state is satisfied. Specifically, since the brush 21 is made of a softer material than that of the commutator 22, the brush 21 side is worn more, and the length of the brush 21 is gradually shortened.

For this reason, in a case where the automatic engine shutdown/restart operation is performed using the starter 11 to which electricity is fed through the brush 21, it is necessary to determine, in advance, a warranty driving count N1 of the starter 11 based on a total brush wear amount and prohibit driving of the starter 11 when the total driving count N of the starter 11 is equal to or greater than the warranty driving count N1 of the starter 11.

In this regard, according to the first embodiment of the invention, a brush temperature T in the engine start operation is compared with a predetermined value T1, and it is determined that a wear amount equal to or smaller than an allowable value is generated in the brush 21 when the brush temperature T in the engine start operation is lower than the predetermined value T1. In addition, the total driving count N of the starter 11 is incremented. Meanwhile, when the brush temperature T in the engine start operation is equal to or higher than the predetermined value T1, it is determined that a wear amount exceeding the allowable value is generated in the brush 21, and the total driving count N of the starter 11 is not incremented. This is because, even in a case where the brush wear amount generated in a single start operation exceeds the allowable value, this is considered similarly to a case where the brush wear amount generated in a single start operation is equal to or smaller than the allowable value, so that an error may occur in the total driving count N by incrementing the total driving count N of the starter 11.

This control performed by the engine controller 3 will be described with reference to the accompanying flowcharts.

Figure 2:
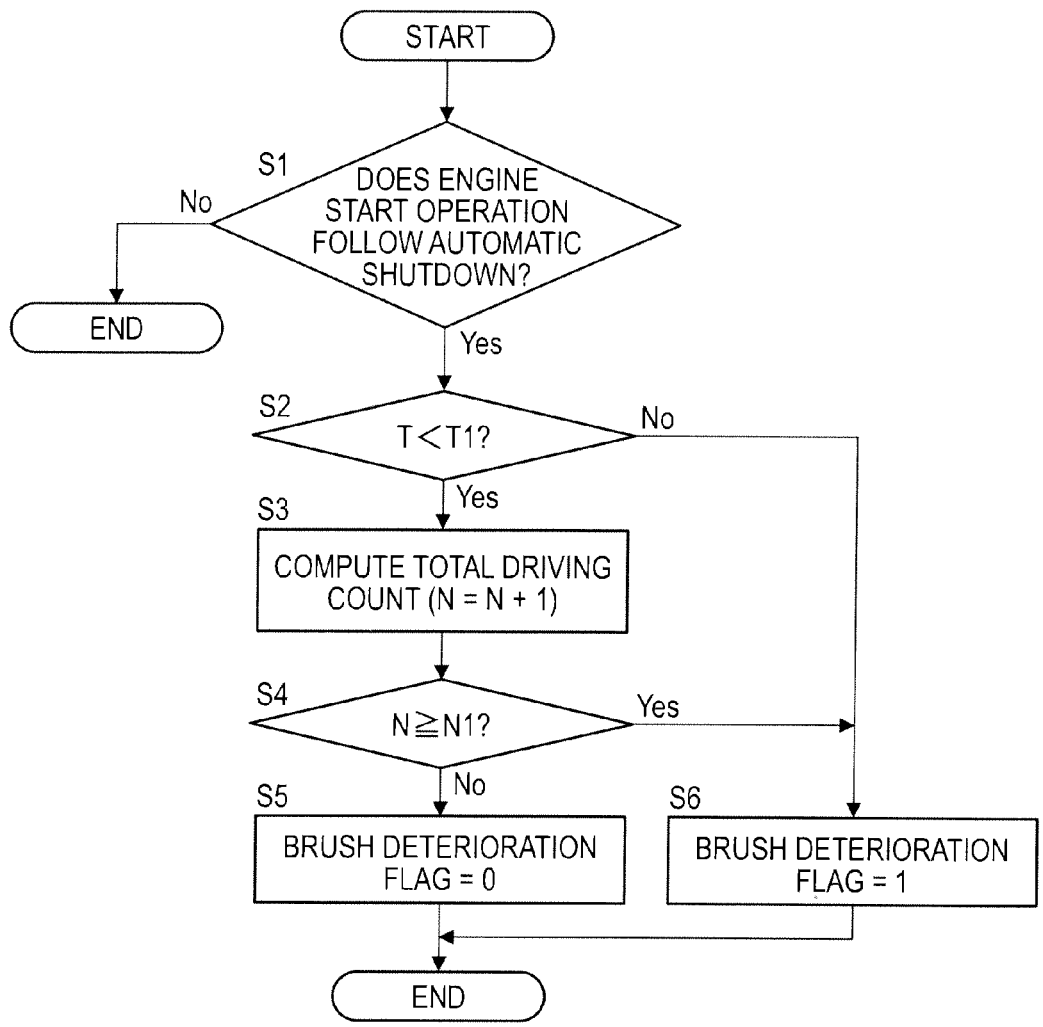
FIG. 2 is a flowchart illustrating setting of a brush deterioration flag according to the first embodiment.

FIG. 2 is a flowchart illustrating a processing for setting the brush deterioration flag. The flowchart of FIG. 2 is executed after the engine starts (whenever the engine starts).

In step S1, it is determined whether or not the engine start operation follows the automatic engine shutdown. Since the engine controller 3 performs the automatic engine shutdown, the engine controller 3 recognizes whether or not the engine is automatically shut down. If the engine start operation does not follow the automatic engine shutdown, the process is terminated directly.

If the engine start operation follows the automatic engine shutdown, the process advances to step S2, so that the brush temperature T in a start operation is compared with a predetermined value T1. The predetermined value T1 is a temperature for determining whether or not the brush 21 is worn over an allowable value and is set to, for example, a value equal to or higher than 100° C. in advance. The brush temperature T in a start operation is detected using the temperature sensor 31 (refer to FIG. 1). The brush temperature T in a start operation may be estimated.

If the brush temperature T in a start operation is lower than the predetermined value T1, it is determined that the brush 21 is not worn over the allowable value, and the process advances to step S3. Then, a value obtained by adding 1 [times] to a driving count N [times] of the starter 11 up to the previous start operation is set as a driving count N of the starter 11 up to the current start operation. That is, based on the following Equation (1), the driving count N of the starter 11 up to current start operation is computed.

$$N = N + 1 \tag{1}$$

Hereinafter, the driving count of the starter 11 up to the current start operation is referred to as a "total starter driving count." The total starter driving count N represents a count of the driving operations of the starter after a new product of the starter 11 starts to be used. The total starter driving count N is initially set to zero [times] when a vehicle is shipped in a factory or an engine is assembled in a factory. Alternatively, the total starter driving count N is initially set to zero [times] when the starter 11 is exchanged with a new product.

In step S4, the total starter driving count N is compared with the warranty driving count N1 [times] of the starter 11. If the total starter driving count is equal to or greater than the warranty driving count N1 of the starter 11, an electricity feeding operation to the commutator 22 may not be efficiently performed due to wear in the brush 21, and the starter 11 may not be driven normally. This value is set in advance based on a specification of the starter 11 and the like. If the total starter driving count N is smaller than the warranty driving count N1 of the starter 11, the process advances to step S5, and the brush deterioration flag is set to zero. When the brush deterioration flag is set to zero, it is possible to normally drive the starter 11. Therefore, the automatic engine shutdown is allowed as described below.

Meanwhile, when the total starter driving count N is equal to or greater than the warranty driving count N1 of the starter 11, it is determined that the starter 11 may not be normally driven due to wear in the brush 21, so that the process advances to step S6, and the brush deterioration flag is set to "1." When the brush deterioration flag is set to "1," the automatic engine shutdown is not allowed as described below (automatic engine shutdown is prohibited).

When the brush temperature T exceeds the predetermined value T1 in step S2, the process advances to step S6, and the brush deterioration flag is set to "1."

Figure 3:
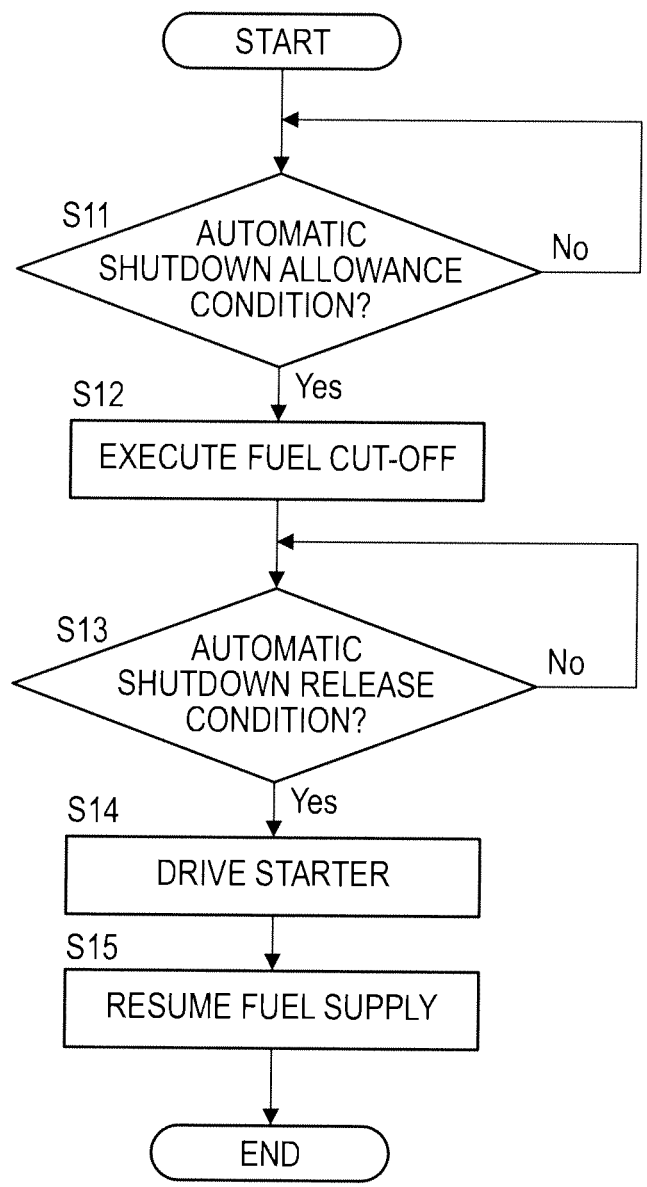
FIG. 3 is a flowchart illustrating an automatic engine shutdown/restart processing according to the first embodiment.

FIG. 3 is a flowchart illustrating a processing in the automatic engine shutdown/restart operation. The flowchart of FIG. 3 illustrates a control flow and is not repeated cyclically.

In step S11, it is determined whether or not an automatic engine shutdown allowance condition is satisfied. Here, the automatic engine shutdown allowance condition is satisfied when both the following conditions (A) and (B) are satisfied.

(A) A general automatic engine shutdown allowance condition is satisfied.

(B) Brush deterioration flag=0

If any one of the conditions (A) and (B) described above is not satisfied, that is, when the brush deterioration flag is set to "1" (brush 21 is deteriorated), it is determined that the automatic engine shutdown allowance condition is not satisfied, and the process waits (automatic engine shutdown is not allowed). In this manner, the condition (B) is newly added as the automatic engine shutdown allowance condition.

If both the conditions (A) and (B) described above are satisfied, it is determined that the automatic engine shutdown allowance condition is satisfied, and the process advances to step S12, so that the fuel cut-off operation is executed.

In step S13, it is determined whether or not an automatic engine shutdown release condition is satisfied. Here, the automatic engine shutdown release condition includes the following condition (C).

(C) A general automatic engine shutdown release condition is satisfied.

If the condition (C) described above is not satisfied, it is determined that the automatic engine shutdown release condition is not satisfied, and the process waits.

If the condition (C) described above is satisfied, it is determined that the automatic engine shutdown release condition is satisfied, and the process advances to steps S14 and S15. In steps S14 and S15, the second starter switch 6 is closed, and the starter 11 is driven to perform cranking. In addition, fuel supply from the fuel injection valve 4 is resumed. As a result, the engine is started (restarted).

Here, effects of the first embodiment will be described.

In a case where the brush temperature T in a start operation is lower than the predetermined value T1, it is considered that a wear amount smaller than an allowable value is generated in the brush 21. In addition, a warranty driving count N1 of the starter 11 is defined. In this case, if the brush temperature T in a start operation is equal to or higher than the predetermined value T1, a wear amount larger than an allowable value is generated in the brush 21. For example, simply to say, it is assumed that the brush wear amount in a case where the brush temperature T in a start operation is equal to or higher than the predetermined value T1 is twice the brush wear amount in a case where the brush temperature T in a start operation is lower than the predetermined value T1. Even in this case, if "1 [times]" is integrated (added) to the total starter driving count N, an error is generated in the total starter driving count N. That is, if "1 [times]" is added to the total driving count N even when the brush wear amount corresponding to two times of start operation is generated in a single start operation by driving the starter 11 at a relatively high temperature, the total driving count N is short by "1 [time]," and a value smaller than the actual value is estimated. As a result, although the starter 11 may not be normally driven in practice due to wear in the brush 21 before the total starter driving count N reaches the warranty driving count N1 of the starter 11, driving of the starter 11 may be allowed.

Meanwhile, according to the first embodiment, in a case where the brush temperature T in a start operation is equal to or higher than a predetermined value, the total driving count N is not incremented. Therefore, it is possible to prevent an error in the total starter driving count N.

In this manner, according to the first embodiment, the brush wear amount in a single start operation is estimated based on the starter brush temperature T in a start operation. Therefore, even when the starter is driven at a high temperature equal to or higher than the predetermined value T1 at which wear in the brush progresses, it is possible to reliably perform the automatic engine shutdown/restart operation.

Second Embodiment

Figure 4:
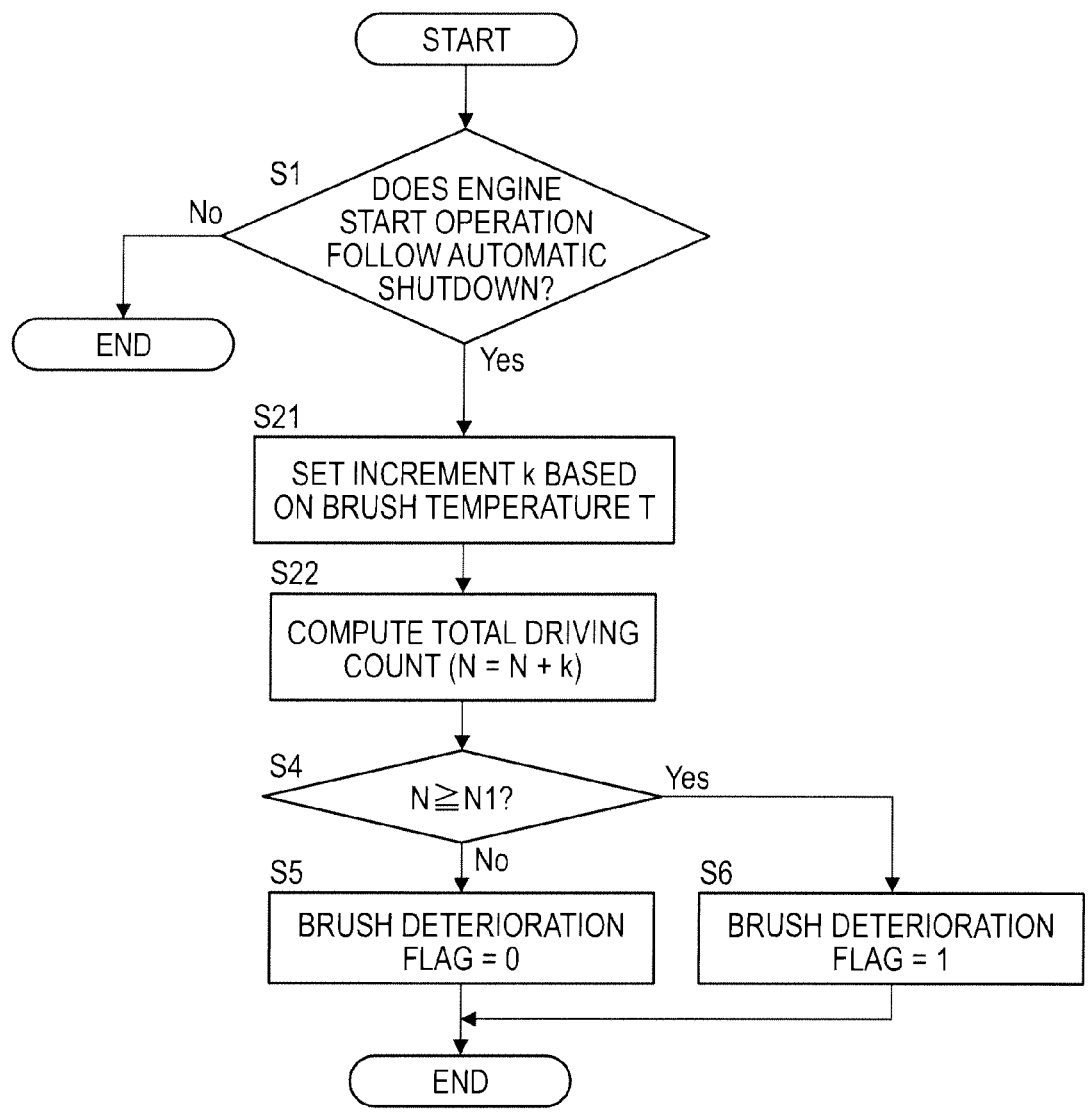
FIG. 4 is a flowchart illustrating setting of the brush deterioration flag according to a second embodiment.

FIG. 4 is a flowchart illustrating a process for setting the brush deterioration flag according to a second embodiment. Since FIG. 4 is similar to FIG. 2 of the first embodiment, like reference numerals denote like elements as in FIG. 2.

In the first embodiment, the total starter driving count N is counted up (computed) whenever a single start operation is performed. Therefore, the unit of the total starter driving count N is [times], and the count-up amount (hereinafter, referred to as "increment") is set to 1 [times] (refer to step S3 of FIG. 2). Meanwhile, according to the second embodiment, a count equal to or greater than "1" depending on a brush temperature T [° C.] in a start operation (that is, a count equivalent value) is set as the increment k [times].

Figure 5:
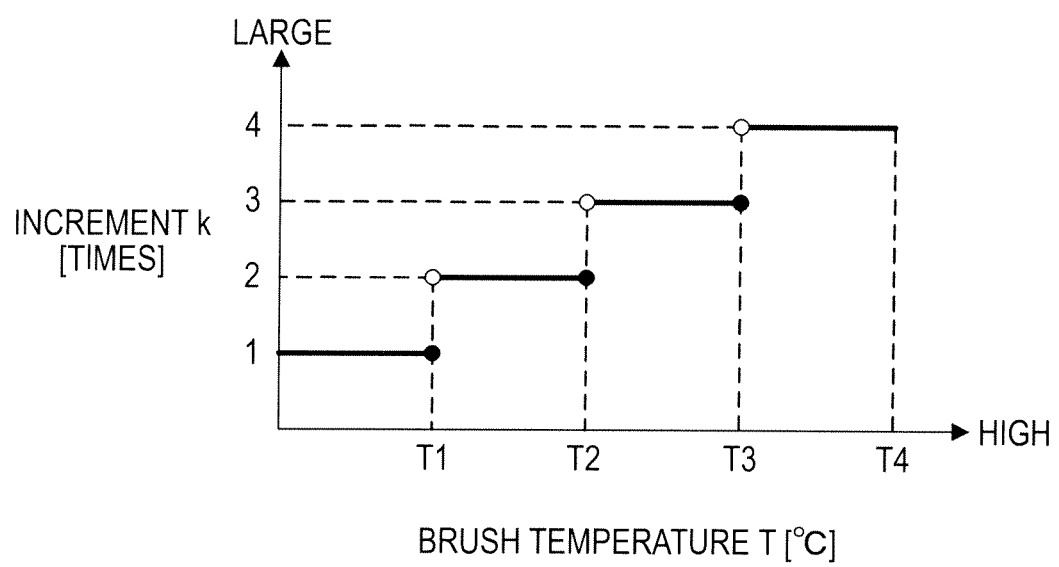
FIG. 5 is a characteristic diagram illustrating an increment against a brush temperature according to the second embodiment.

Focusing on the portions different from those of the first embodiment, in step S21 of FIG. 4, a table obtained by reflecting the characteristic of FIG. 5 is searched using the brush temperature T [° C.] in the start operation, and the increment k [times] is set to an integer equal to or greater than "1."

FIG. 5 is a characteristic diagram illustrating the increment k [times] against the brush temperature according to the second embodiment. In FIG. 5, the abscissa denotes the brush temperature T in the start operation, and the ordinate denotes the increment k. The brush temperature in a start operation includes a first reference temperature T1 [° C.], a second reference temperature T2 [° C.], a third reference temperature T3 [° C.], and a fourth reference temperature T4 [° C.] (T1<T2<T3<T4). In a case where the brush temperature T in a start operation is equal to or lower than the first reference temperature (T≤T1), the increment k is set to 1 [times]. In this case, the subsequent processing is similar to that of the first embodiment.

Meanwhile, in a case where the brush temperature in a start operation exceeds the first reference temperature T1 and is equal to or lower than the second reference temperature T2 (T1<T≤T2), the increment k is set to 2 [times]. Similarly, in a case where the brush temperature in a start operation exceeds the second reference temperature T2 and is equal to or lower than the third reference temperature T3 (T2<T≤T3), the increment k is set to 3 [times]. Similarly, in a case where the brush temperature in a start operation exceeds the third reference temperature T3 and is equal to or lower than the fourth reference temperature T4 (T3<T≤T4), the increment k is set to 4 [times]. This means that, for example, in a case where a single start operation is performed when the brush temperature in a start operation is set to T1<T≤T2, the brush temperature in a start operation is relatively high, compared to the case where T≤T1, so that the brush wear amount in a single start operation becomes twice that of the case where the brush temperature in a start operation is equal to or lower than the first reference temperature T1. Therefore, assuming that the brush wear amount in a single start operation under a condition T≤T1 is used as a reference, wear in the brush becomes twice that of a single start operation under a condition T1<T≤T2. Therefore, it is necessary to add "2 [times]" to the total starter driving count N.

That is, the brush wear amount in a single start operation is relatively large in a case where the starter 11 is driven in a relatively high temperature state in which the brush temperature in a start operation exceeds the first reference temperature T1, compared to a case where the starter 11 is driven in a relatively low temperature state in which the brush temperature in a start operation is equal to or lower than the first reference temperature T1. That is, the warranty driving count N1low in a case where the starter 11 is driven in a relatively low brush temperature state is different from the warranty driving count N1high in a case where the starter 11 is driven in a relatively high brush temperature state, and a relationship therebetween may be set to N1low>N1high. Therefore, assuming that the warranty driving count N1 in a case where the starter 11 is driven in a relatively low brush temperature state is suitable, the warranty driving count N1 is not suitable (excessively larger than a suitable value) if the starter 11 is driven in a relatively high brush temperature state. In this regard, if the starter 11 is driven in a relatively high brush temperature state, the increment k increases compared to a case where the starter 11 is driven in a relatively low brush temperature state. As a result, compared to a case where the starter 11 is driven in a relatively low brush temperature state, the warranty driving count N1 is reached earlier.

Although four reference temperatures (T1 to T4) are employed, and the increment k is set to an integer equal to or greater than "1," the invention is not limited thereto. At least one or more reference temperatures may be set, and the increment k may be set to a decimal fraction equal to or greater than "1." The number of the reference temperatures and the increment k are finally set to a suitable value. Although the increment k is a discontinuous value in FIG. 5, the increment k may be set to a continuous value.

Description will be returned to the processing of the flowchart of FIG. 4. In step S22, a value obtained by adding the increment k to the total starter driving count N is set to the total starter driving count N. That is, the total starter driving count N is computed based on the following Equation (2).

$$N=N+k \quad (2)$$

Although the total starter driving count N is computed using an addition format in step S22, the total starter driving count N may be computed using a multiplication format, that is, as indicated by the following Equation (3). The factor k1 of Equation (3) refers to an increment ratio [%].

$$N=N \cdot k1 \quad (3)$$

The idle stop control device according to the second embodiment has a starter 11 to which electricity is fed through the brush 21. If the automatic engine shutdown allowance condition (first condition) in a vehicle stop state is satisfied, the engine is automatically shut down. Then, if the automatic engine shutdown release condition (second condition) in a vehicle stop state is satisfied, the engine is restarted using the starter 11. In this idle stop control device, the increment k as a count equivalent value is set based on the brush temperature in a start operation (corresponding to the brush wear amount in a single start operation), and a value obtained by integrating the increment k is computed as a total start count N of the starter. When the total restart count N of the starter is equal to or greater than the warranty driving count N1 of the starter, the brush deterioration flag is set to "1" (automatic engine shutdown is prohibited). As a result, even when the automatic engine shutdown/restart operation is performed by driving the starter 11 to which electricity is fed through the brush 21, it is possible to reliably perform the automatic engine shutdown/restart operation.

According to the second embodiment, it is estimated that the brush wear amount in a single start operation increases as the brush temperature T in a start operation increases. Therefore, even when the brush temperature T in a start operation is different, it is possible to estimate the brush wear amount in a single start operation with high accuracy.

Although the total starter driving count N is computed based on the brush temperature T in the restart operation following the automatic shutdown in the present embodiment, the total starter driving count N may be computed based on the brush temperature T obtained in consideration of a manual start operation.

Third Embodiment

Figure 6:
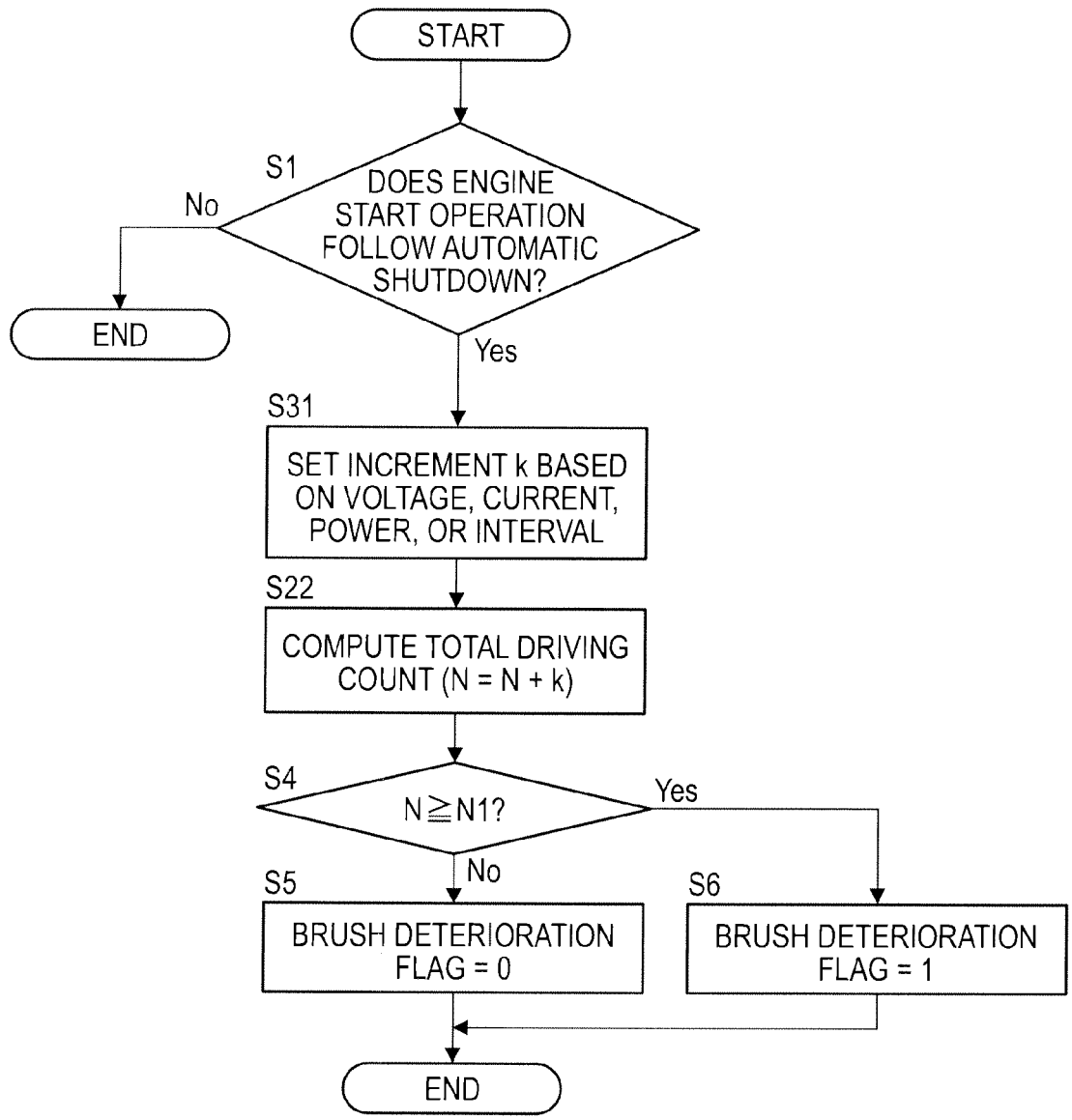
FIG. 6 is a flowchart illustrating setting of the brush deterioration flag according to a third embodiment.

FIG. 6 is a flowchart illustrating a processing for setting the brush deterioration flag according to a third embodiment. Since FIG. 6 is similar to FIG. 4 of the second embodiment, like reference numerals denote like elements as in FIG. 4.

In the second embodiment, the increment k is set based on the brush temperature T in a start operation. According to the third embodiment, the increment k is set based on at least one of values associated with the operation of the starter 11, such as a voltage, an electric current, an electric power, and an interval. Here, the "voltage" refers to a voltage applied to the starter 11 in a single start operation, the "electric current" refers to a current flowing through the starter 11 in a single start operation, the "electric power" refers to an electric power consumption of the starter 11 in a single start operation, and the "interval" refers to an interval between the latest start timing and the immediately previous start timing.

Figure 7:
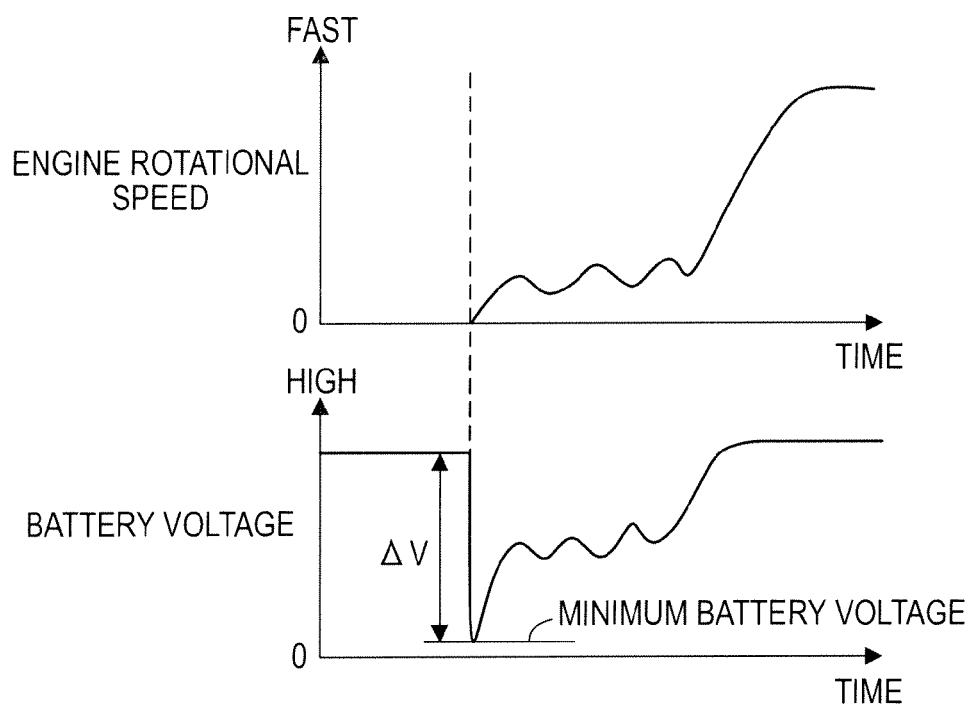
FIG. 7 is a characteristic diagram illustrating a battery voltage change in the start operation.

The increment k is set based on at least one of the voltage, the electric current, the electric power, and the interval because the voltage, the electric current, the electric power, and the interval are closely associated with the brush temperature in a start operation (brush wear amount in a single start operation). For example, the voltage applied to the starter 11 in a start operation changes as illustrated in FIG. 7. In this case, it is known that a difference voltage ΔV between the battery voltage before the start operation and the minimum battery voltage immediately after the start operation is associated with the brush temperature in the start operation, and the difference voltage ΔV increases as the brush temperature T in a start operation increases.

Figure 8:
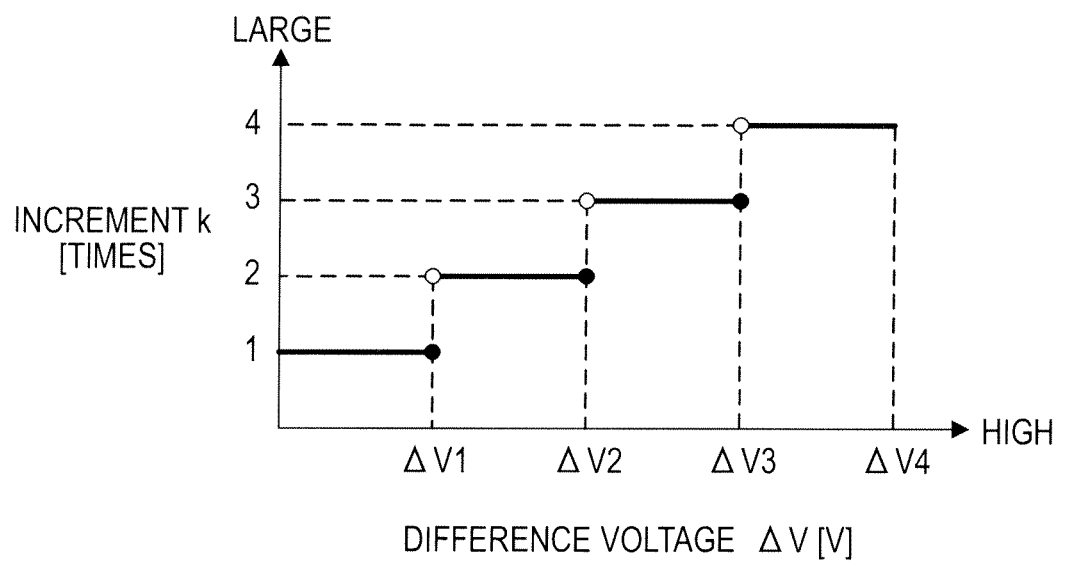
FIG. 8 is a characteristic diagram illustrating an increment against a difference voltage according to the third embodiment.

Therefore, the characteristic of the increment k against the difference voltage ΔV is set as illustrated in FIG. 8. In FIG.

8, as a reference difference voltage for comparison with the difference voltage, a first reference difference voltage ΔV1 [V], a second reference difference voltage ΔV2 [V], a third reference difference voltage ΔV3 [V], and a fourth reference difference voltage ΔV4 [V] are set (ΔV1<ΔV2<ΔV3<ΔV4). In a case where the difference voltage ΔV is equal to or lower than the first reference difference voltage ΔV1 (ΔV≤ΔV1), the increment k is set to "1 [times]." The processing in this case is similar to that of the first embodiment.

Meanwhile, in a case where the difference voltage exceeds the first reference difference voltage ΔV1 and is equal to or lower than the second reference difference voltage ΔV2 (ΔV1<ΔV≤ΔV2), the increment k is set to "2 [times]." Similarly, in a case where difference voltage exceeds the second reference difference voltage ΔV2 and is equal to or lower than the third reference difference voltage ΔV3 (ΔV2<ΔV≤ΔV3), the increment k is set to "3 [times]." Similarly, in a case where difference voltage exceeds the third reference difference voltage ΔV3 and is equal to or lower than the fourth reference difference voltage ΔV4 (ΔV3<ΔV≤ΔV4), the increment k is set to "4 [times]." This means that, in a case where the difference voltage has a relationship of ΔV1<ΔV≤ΔV2, the brush temperature even in a single start operation is higher, compared to a case where the relationship of ΔV≤ΔV1 is satisfied, and the brush wear amount in a single start operation becomes twice. Therefore, assuming that the brush wear amount in a single start operation in the case of ΔV≤ΔV1 is used as a reference, a wear amount in the brush 21 in a single start operation becomes twice in the case of ΔV1<ΔV≤ΔV2. Therefore, it is necessary to add "2 [times]" to the total starter driving count N.

Here, a case where the difference voltage ΔV is equal to the first reference difference voltage ΔV1 corresponds to a case where the brush temperature T in a start operation is equal to the first reference temperature T1 in a start operation in the second embodiment. Similarly, a case where the difference voltage ΔV is equal to the second reference difference voltage ΔV2 corresponds to a case where the brush temperature T in a start operation is equal to the second reference temperature T2 in the second embodiment. Similarly, a case where the difference voltage ΔV is equal to the third reference difference voltage ΔV3 corresponds to a case where the brush temperature T in a start operation is equal to the third reference temperature T3 in the second embodiment. Similarly, a case where the difference voltage ΔV is equal to the fourth reference difference voltage ΔV4 corresponds to a case where the brush temperature T in a start operation is equal to the fourth reference temperature T4 in the second embodiment.

Although four reference difference voltages (ΔV1 to ΔV4) are employed, and the increment k is an integer equal to or greater than 1 in FIG. 8, the invention is not limited thereto. At least one or more reference difference voltages may be employed, and the increment k may be set to a decimal fraction equal to or greater than "1." The number of reference difference voltages and the increment k are appropriately set finally. In addition, although the increment k is a discontinuous value in FIG. 8, the increment k may be set to a continuous value.

Similarly, a relationship between the electric current, the electric power, or the interval and the brush temperature in a start operation or the brush wear amount in a single start operation may be appropriately obtained in advance, and the increment k may be set based on this relationship. That is, a relationship between any one of the electric current, the electric power, or the interval and the increment k may be set to the characteristic of FIG. 8, and the increment k may be set by searching a table containing the characteristic using any one of the electric current, the electric power, or the interval. For example, the brush temperature in a start operation may be predicted based on the electric energy consumption. Alternatively, the brush temperature in a start operation may be predicted by measuring a resistance value (voltage difference) of the starter itself. When the electric current flowing through the starter in a start operation is relatively large, the increment k is set to a greater value compared to a case where the current is small. Similarly, when the electric power consumption of the starter in a start operation is relatively large, the increment k is set to a greater value compared to a case where the electric power consumption is small. Similarly, when the interval is relatively small, the increment k is set to a greater value compared to a case where the interval is relatively large. Similarly, when a short interval is continuously set, the increment k is set to a greater value compared to a case where the short interval is not continuously set.

Returning to FIG. 6, in step S22, a value obtained by adding this increment k to the total driving count N is set as the total driving count N again. That is, the total driving count N is computed based on the Equation (2) described above.

According to the third embodiment, it is possible to obtain the same effects as those of the second embodiment.

Fourth Embodiment

Figure 9:
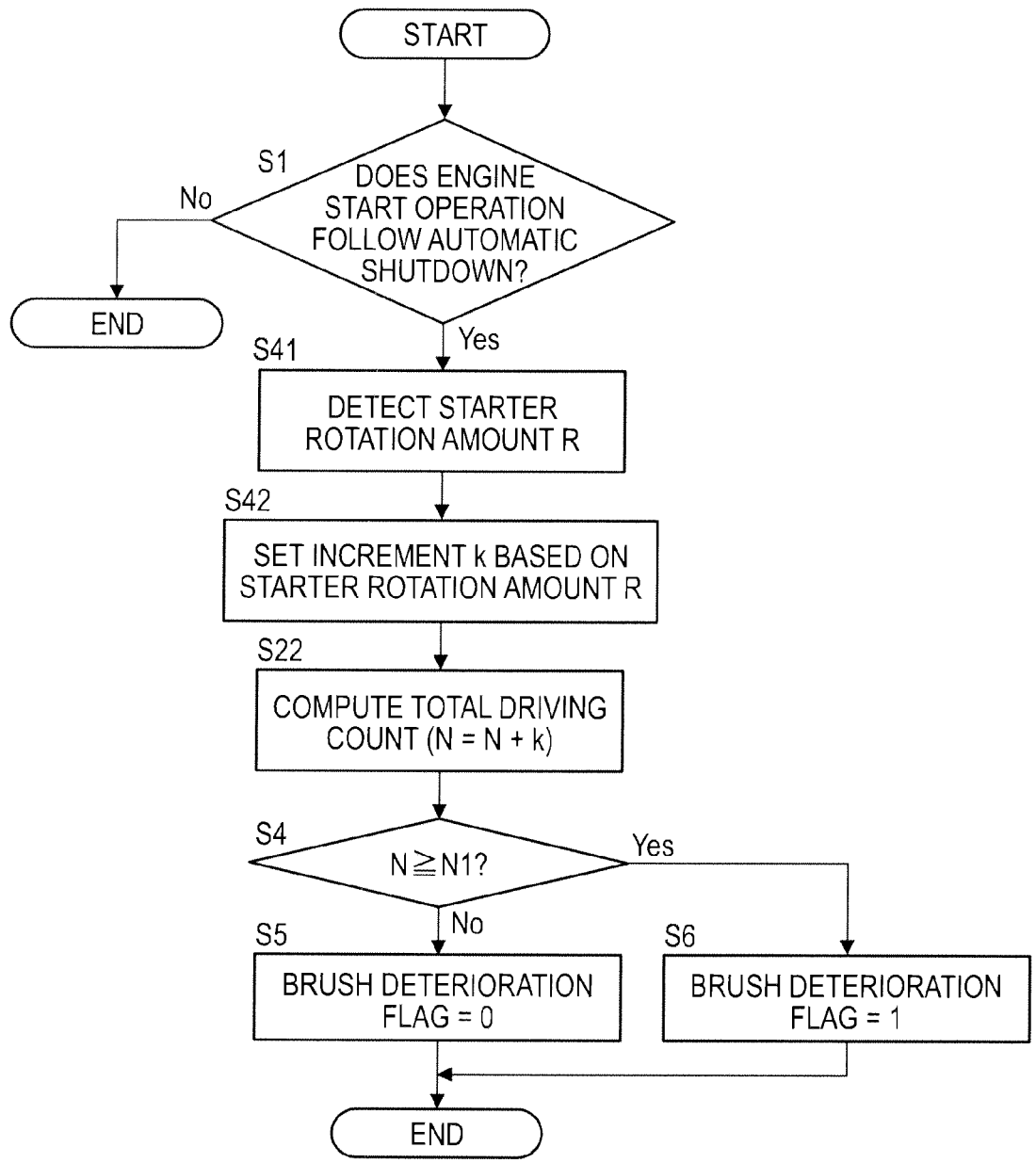
FIG. 9 is flowchart illustrating setting of the brush deterioration flag according to a fourth embodiment.

FIG. 9 is a flowchart illustrating a processing for setting the brush deterioration flag according to a fourth embodiment. Since FIG. 9 is similar to FIG. 4 of the second embodiment, like reference numerals denote like elements as in FIG. 4.

In the second embodiment illustrated in FIG. 4, the brush temperature T in a start operation is detected or estimated, and the increment k is set by assuming that the brush wear amount in a single start operation increases as the brush temperature T in a start operation increases. Meanwhile, according to the fourth embodiment, a rotation amount R of the motor 12 in a single start operation is detected (hereinafter, the rotation amount of the motor 12 will be referred to as a "starter rotation amount"). As the starter rotation amount R in a single start operation increases, the brush wear amount in a single start operation increases. That is, as the starter rotation amount R in a single start operation increases, the increment k is set to a larger value.

Description will be made by focusing on the portions different from those of the second embodiment. Referring to FIG. 9, in step S41, the starter rotation amount R in a single start operation is detected using an angle sensor (not illustrated) provided in the motor 12. The starter rotation amount R in a single start operation may be obtained through estimation. For example, if a relationship between an activation time or an electricity feeding time of the starter 11 in a single start operation and the starter rotation amount R in a single start operation is obtained as a characteristic in advance, it is possible to estimate the starter rotation amount R in a single start operation by searching a table containing the characteristic using the activation time or the electricity feeding time of the starter in a single start operation. The activation time or the electricity feeding time of the starter 11 in a single start operation is recognized by the engine controller 3.

Figure 10:
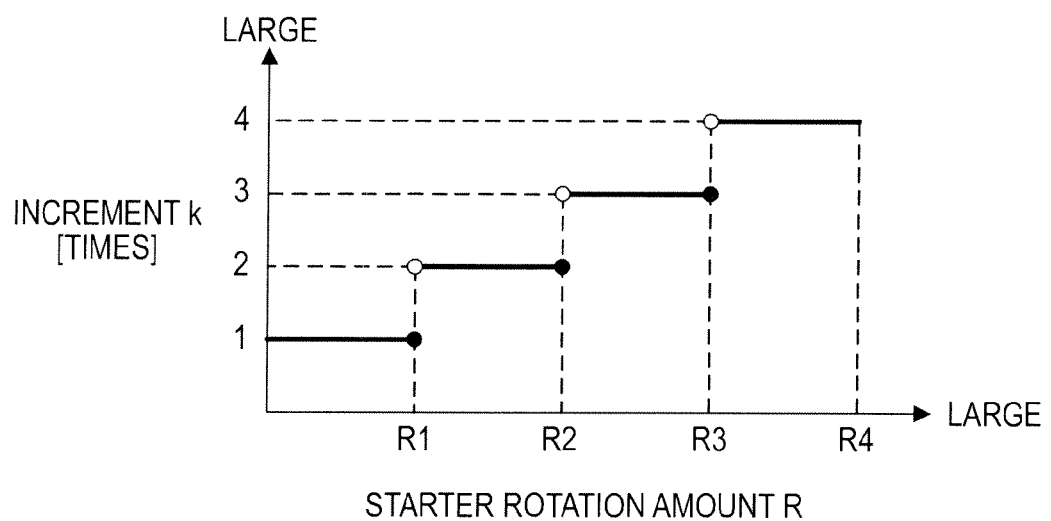
FIG. 10 is a characteristic diagram illustrating an increment against a starter rotation amount according to the fourth embodiment.

In step S42, the increment k [times] is set by searching a table containing the characteristic of FIG. 10 using the starter rotation amount R in a single start operation obtained in step S41.

FIG. 10 is a characteristic diagram illustrating the increment k against the starter rotation amount R. In FIG. 10, the abscissa denotes the starter rotation amount R in a single start operation, and the ordinate denotes the increment k. In addition, as a reference value of the starter rotation amount in a single start operation, a first reference starter rotation amount R1, a second reference starter rotation amount R2, a third reference starter rotation amount R3, and a fourth reference starter rotation amount R4 are set (R1<R2<R3<R4). In a case where the starter rotation amount R in a single start operation is equal to or smaller than the first reference starter rotation amount (R≤R1), the increment k is set to "1 [times]." The processing in this case is similar to that of the first embodiment.

Meanwhile, the starter rotation amount R in a single start operation exceeds the first reference starter rotation amount R1 and is equal to or smaller than the second reference starter rotation amount R2 (R1<R≤R2), the increment k is set to "2 [times]." Similarly, in a case where the starter rotation amount R in a single start operation exceeds the second reference starter rotation amount R2 and is equal to or smaller than the third reference starter rotation amount R3<R≤3), the increment k is set to "3 [times]." Similarly, in a case where the starter rotation amount R in a single start operation exceeds the third reference starter rotation amount R3 and is equal to or smaller than the fourth reference starter rotation amount R4 (R3<R≤R4), the increment k is set to "4 [times]." This means that, for example, in a case where the starter rotation amount in a single start operation is set to R1<R≤R2, the brush wear amount even in a single start operation becomes twice compared to the case of R≤R1. Therefore, assuming that the brush wear amount in a single start operation in the case of R≤R1 is used as a reference, the brush wear amount in a single start operation becomes twice, in the case of R1<R≤R2. Therefore, it is necessary to add "2 [times]" to the total starter driving count N.

In step S22, a value obtained by adding the increment k set in step S42 to the total starter driving count N is set as the total starter driving count N again. That is, the total starter driving count N is computed based on the Equation (2) described above.

According to the fourth embodiment, the brush wear amount in a single start operation is estimated based on the starter rotation amount R in a single start operation. Therefore, even when the starter rotation amount R in a single start operation is different, it is possible to estimate the brush wear amount in a single start operation with high accuracy. In particular, it is estimated that the brush wear amount in a single start operation increases as the starter rotation amount R in a single start operation increases. Therefore, even when the starter rotation amount R in a single start operation is different, it is possible to estimate the brush wear amount in a single start operation with high accuracy.

Fifth Embodiment

Figure 11:
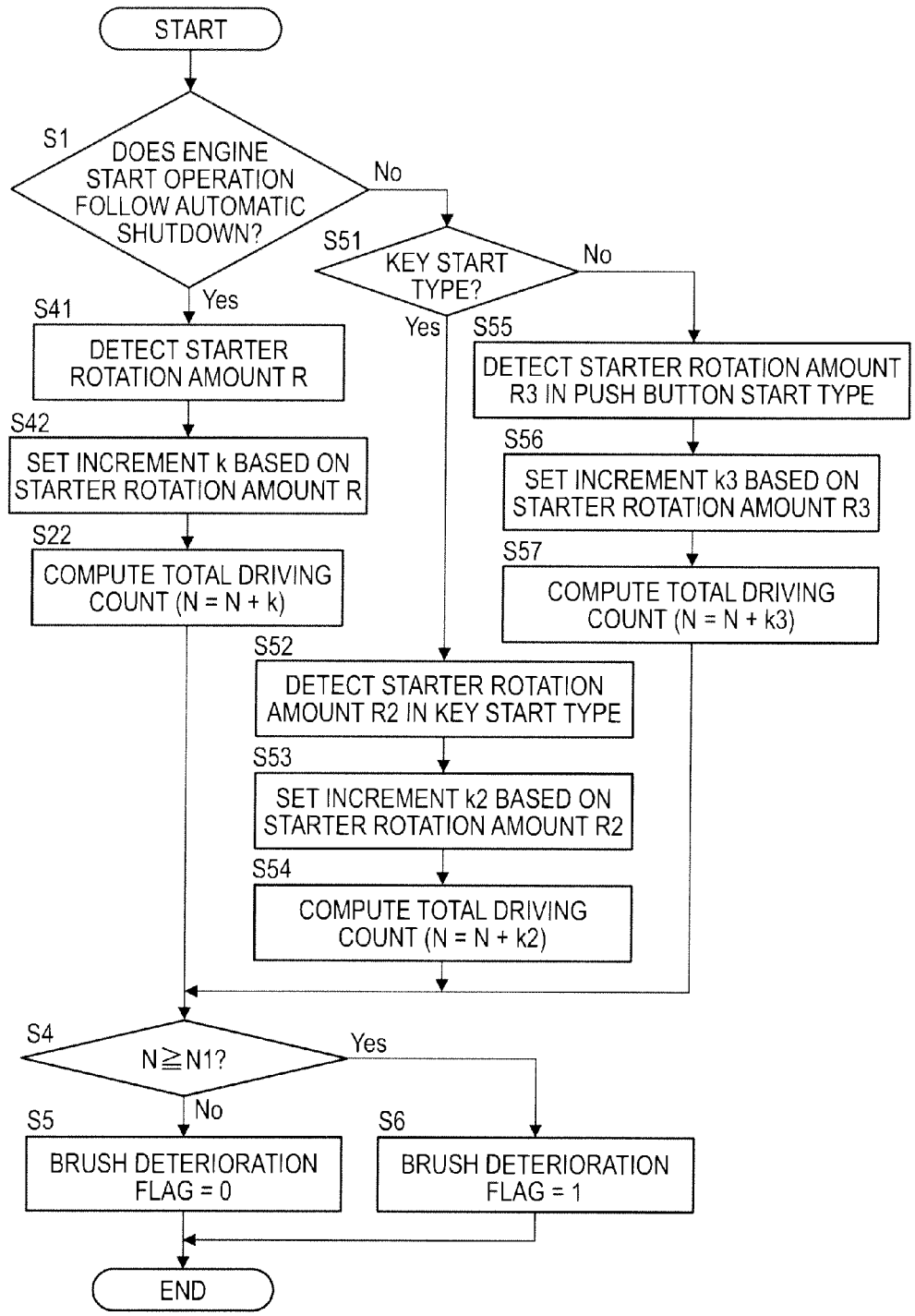
FIG. 11 is a flowchart illustrating setting of the brush deterioration flag according to a fifth embodiment.

FIG. 11 is a flowchart illustrating a processing for setting the brush deterioration flag according to a fifth embodiment. Since FIG. 11 is similar to FIG. 9 of the fourth embodiment, like reference numerals denote like elements as in FIG. 9.

In the fourth embodiment illustrated in FIG. 9, consideration is made for the starter rotation amount R in a single start operation caused by the automatic start operation. According to the fifth embodiment, consideration is further made for the starter rotation amounts R2 and R3 (described below) in a single start operation caused by the manual start operation. That is, the total starter driving count N is computed in consideration of the starter rotation amounts R2 and R3 in a single start operation caused by a manual start operation.

Hereinafter, description will be made by focusing on the portions different from those of the fourth embodiment. In FIG. 11, if it is determined that the engine start operation does not follow the automatic engine shutdown in step S1, that is, if it is determined that the manual start operation (start operation made by a driver) is performed, the process advances to step S51, and it is determined whether or not the manual start operation is a key start type.

The manual start operation includes a push button start type and a key start type. Here, in the "push button start type," if a driver presses down a push button provided in a driver's seat, a control unit such as body control module activates the starter 11 by closing the second starter switch 6 instead of a driver. Meanwhile, in the "key start type," the starter 11 is continuously activated while a driver closes the starter switch 2 (refer to FIG. 1A). Which start type is used is determined in advance according to a specification of a vehicle.

In step S51, if the manual start operation is performed in a key start type, the process advances to step S52, and the starter rotation amount R2 in a single start operation in the key start type is detected. Subsequently, in step S53, the increment k is set based on the obtained starter rotation amount R2 in a single start operation of the key start type. The processing in steps S52 and S53 is similar to that of steps S41 and S42, respectively. That is, in step S52, the starter rotation amount R2 in a single start operation of the key start type is detected using an angle sensor (not illustrated) provided in the motor 12. However, the starter rotation amount R2 in a single start operation of the key start type may be estimated. For example, if a characteristic representing a relationship between the activation time or the electricity feeding time of the starter 11 in a single start operation of the key start type and the starter rotation amount R2 in a single start operation of the key start type is appropriately obtained in advance, it is possible to estimate the starter rotation amount R2 in a single start operation of the key start type by searching a table containing the characteristic using the activation time or the electricity feeding time of the starter 11 in a single start operation of the key start type. Here, the activation time or the electricity feeding time of the starter 11 in a single start operation of the key start type is recognized by the engine controller 3.

In the case of the push button start type, the starter rotation amount stays only in an appropriate time. Meanwhile, in the case of the key start type, the time for continuously activating the starter 11 tends to increases, particularly in a low temperature start operation, and the starter rotation amount R2 in a single start operation of the key start type increases.

In step S54, a value obtained by adding the increment k2 set in step S53 to the total starter driving count N is set to the total starter driving count N again. That is, the total starter driving count N is computed based on the following Equation (4).

$$N = N + k2 \qquad (4)$$

Meanwhile, if it is determined in step S51 that the manual start operation is not the key start type, that is, but the push button start type, the process advances to step S55, and the starter rotation amount R3 in a single start operation of the push button start type is detected. Subsequently, in step S56, the increment k3 is set based on the obtained starter rotation amount R3 in a single start operation of the push button start type. The processing in steps S55 and S56 is slightly different from that of steps S52 and S53.

That is, while a driver instructs activation of the starter 11 of the push button start type, the starter 11 is driven by a control unit such as a body control module. For this reason, how long the starter 11 is driven, that is, the starter rotation amount R3 in a single start operation of the push button start type is determined in advance. Therefore, this value determined in advance (certain value) is set to the starter rotation amount R3 in a single start operation of the push button start type, and the increment k3 (certain value equal to or greater than "1") is set based on the starter rotation amount R3.

In step S57, a value obtained by adding the increment k3 set in step S56 to the total starter driving count N is set to the total starter driving count N again. That is, the total starter driving count N is computed based on the following Equation (5).

$$N=N+k3 \quad (5)$$

In this manner, according to the fifth embodiment, the total starter driving count N is computed in consideration of the starter rotation amounts R2 and R3 in a single start operation caused by the manual start operation as well as the starter rotation amount R in a single start operation caused by the automatic start operation. Therefore, it is possible to obtain the same effects as those of the fourth embodiment.

Sixth Embodiment

Figure 12:
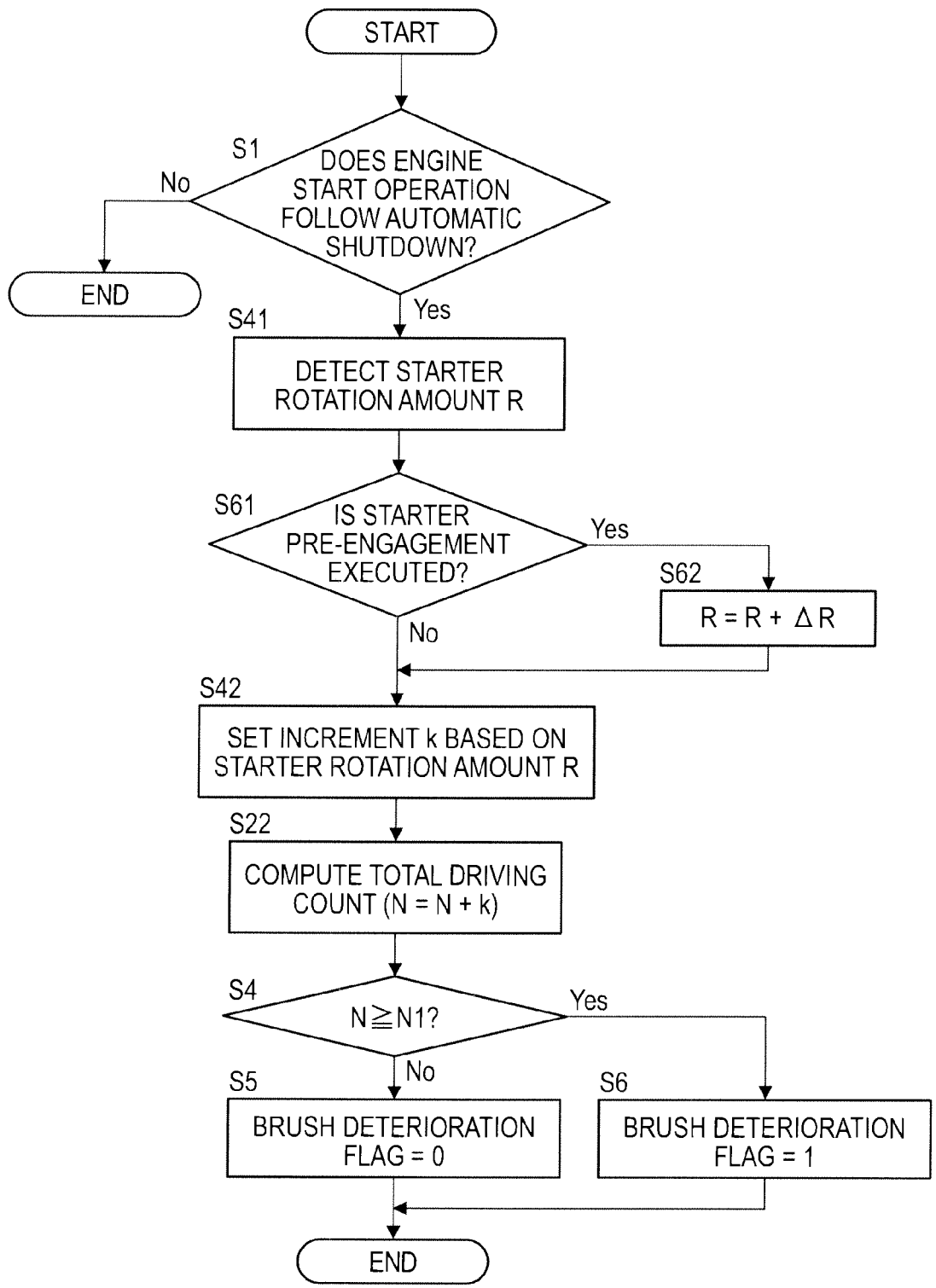
FIG. 12 is a flowchart illustrating setting of the brush deterioration flag according to a sixth embodiment.

FIG. 12 is a flowchart illustrating a processing for setting the brush deterioration flag according to a sixth embodiment. Since FIG. 12 is similar to FIG. 9 of the fourth embodiment, like reference numerals denote like elements as in FIG. 9.

Starter pre-engagement may occur while the engine rotation speed decreases from the idle state to zero in the automatic engine shutdown. Here, "starter pre-engagement" refers to an operation for meshing the ring gear 19 and the pinion gear 18 of the starter 11 in advance in preparation of the restart operation from the automatic engine shutdown.

The starter pre-engagement will be described in short. The ring gear 19 is formed in an outer circumference of the flywheel mounted in the rear end of the crankshaft. As the starter 11 receives a start request, the ring gear 19 is driven (cranking is performed) by meshing the pinion gear 18 with the ring gear 19. The pinion gear 18 of the starter 11 does not mesh with the ring gear 19 in an ordinary time. Therefore, in order to mesh the pinion gear 18 with the ring gear 19, a certain period of time is necessary. Meanwhile, when the restart operation is performed from the automatic shutdown state, a driver may desire to succeed in cranking (start) as soon as possible. In response to this desire, the starter pre-engagement was designed. That is, necessity of the operation of meshing the pinion gear 18 and the ring gear 19 at the time of the start operation is removed by meshing the ring gear 19 and the pinion gear 18 of the starter 11 in advance in preparation of the restart operation from the automatic engine shutdown. Accordingly, it is possible to perform cranking rapidly.

In this manner, in the idle stop control device having a starter pre-engagement functionality, the starter rotation amount R in a single start operation substantially increases, compared to the idle stop control device having no starter pre-engagement functionality. In this regard, according to the fifth embodiment, in the idle stop control device having the starter pre-engagement functionality, the starter rotation amount corresponding to rotation in the starter pre-engagement is included in (added to) the starter rotation amount R in a single start operation.

Description will be made by focusing on the portions different from those of the fourth embodiment.

Referring to FIG. 12, in step S61, it is determined whether or not the starter pre-engagement is performed. Whether or not the starter pre-engagement is performed is recognized by the engine controller 3 in advance. If the starter pre-engagement is not performed, the operation of steps S42 and S22 is executed. This is similar to that of the fourth embodiment.

Meanwhile, if the starter pre-engagement is performed, the process advances from step S61 to step S62, and a value obtained by adding a certain value ΔR to the starter rotation amount R in a single start operation is set to the starter rotation amount R in a single start operation. Here, the certain value ΔR is a starter rotation amount caused by the starter pre-engagement. The certain value ΔR is appropriately obtained in advance.

According to the sixth embodiment, the starter rotation amount caused by the starter pre-engagement is included in the starter rotation amount R in a single start operation. Therefore, even when the idle stop control device has a starter pre-engagement functionality, it is possible to obtain the total starter driving count N with high accuracy. In particular, the sixth embodiment is advantageous when the starter rotation amount R is estimated.

Seventh Embodiment

Figure 13:
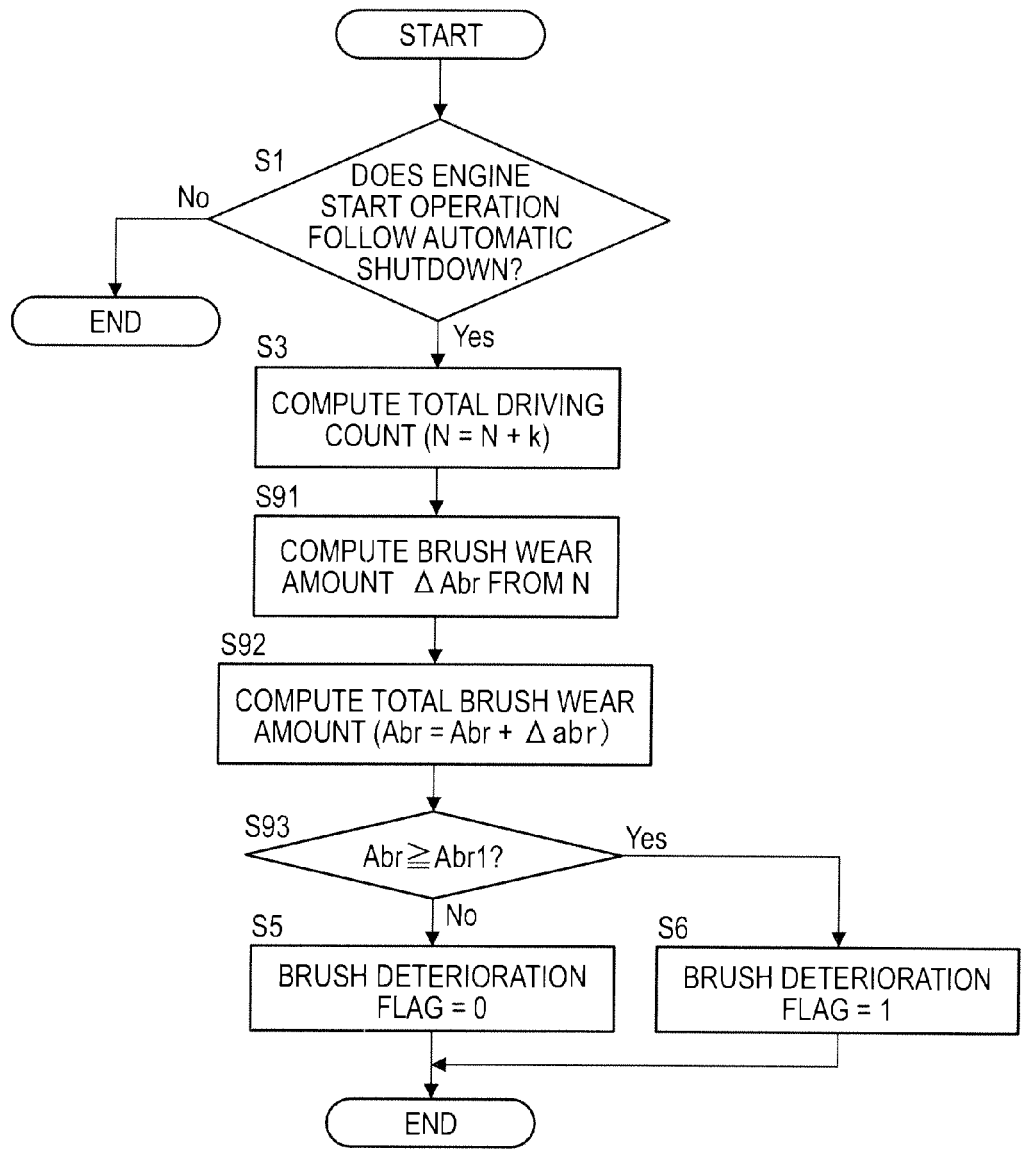
FIG. 13 is a flowchart illustrating setting of the brush deterioration flag according to a seventh embodiment.

FIG. 13 is a flowchart illustrating a processing for setting the brush deterioration flag according to a seventh embodiment. Since FIG. 13 is similar to FIG. 9 of the fourth embodiment, like reference numerals denote like elements as in FIG. 2.

In the fourth embodiment of FIG. 9, it is determined that the brush wear amount in a single start operation increases as the starter rotation amount R in a single start operation increases. Therefore, the starter rotation amount R in a single start operation is reflected on the increment k. According to the seventh embodiment, consideration is made directly on the brush wear amount ΔAbr in a single start operation itself.

Description will be made by focusing on the portions different from those of the fourth embodiment.

In step S1 of FIG. 13, if the engine start operation follows the automatic engine shutdown, the process advances to step S3, and a value obtained by adding "1 [times]" to the total starter driving count N [times] is set as a new total starter driving count N. That is, the total starter driving count N is computed based on the Equation (1) described above.

Figure 14:
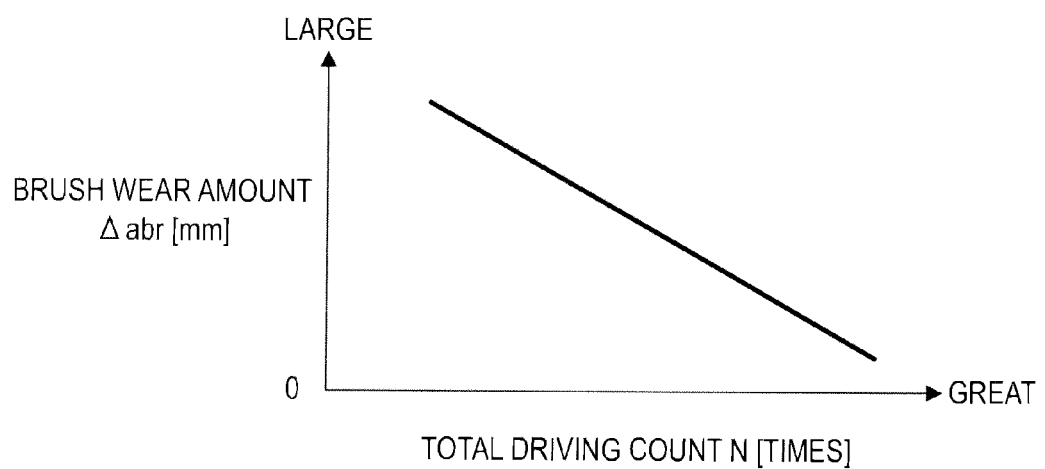
FIG. 14 is a characteristic diagram illustrating a brush wear amount against a total driving count according to the seventh embodiment.

In step S91, the brush wear amount ΔAbr [mm] in a single start operation is computed by searching a table containing the characteristic of FIG. 14 using the total starter driving count N obtained in step S3.

FIG. 14 is a characteristic diagram illustrating the brush wear amount ΔAbr [mm] against the total starter driving count N. The brush wear amount ΔAbr in a single start operation decreases as the total starter driving count N increases as illustrated in FIG. 14. This is obtained from the characteristic indicated by the solid line in FIG. 15.

Figure 15:
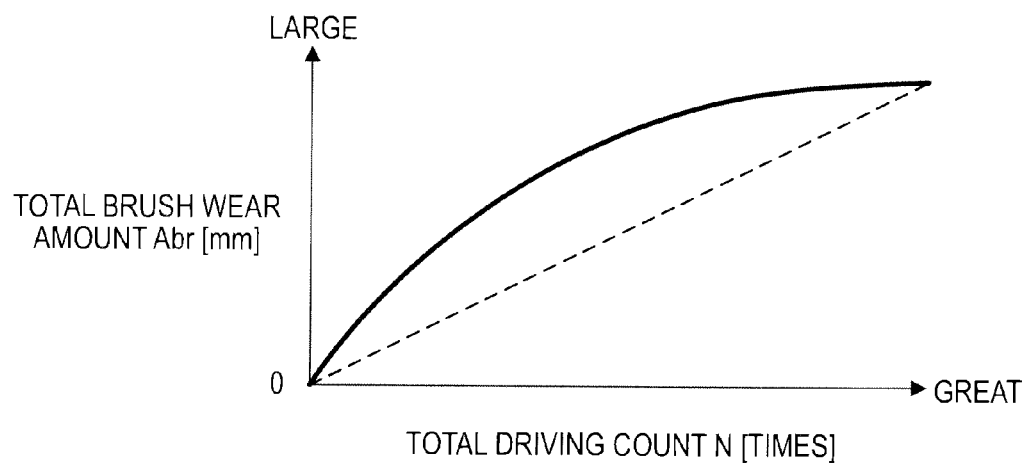
FIG. 15 is a characteristic diagram illustrating a total brush wear amount against a total driving count according to the seventh embodiment.

FIG. 15 is a diagram illustrating how the total brush wear amount Abr increases against the total starter driving count N. Referring to FIG. 15, in an area where the total starter driving count N is relatively small, wear in the brush progresses abruptly. In an area where the total starter driving count N is relatively large, wear in the brush slowly progresses. Such an upwardly convex characteristic is caused by the configuration of the brush 21. That is, although not illustrated in FIG. 1, an excellent electric contact with the commutator 22 is obtained by pressing the brush 21 to the commutator 22 using a spring. Therefore, even when the commutator 22 is rotated, electricity is efficiently fed from the brush 21 to the commutator 22. Depending on a type of the starter 11, typically, wear in the brush tends to decrease due to a relationship with a tension of the spring and the like if the total starter driving count N relatively increases, and the length of the brush 21 is shortened, compared to a case where the total starter driving count N is relatively small. Due to this tendency, the characteristic of the total brush wear amount has an upwardly convex curve shape as illustrated in FIG. 15.

In step S92, a value obtained by adding the brush wear amount ΔAbr in a single start operation to the total brush wear amount Abr [mm] (initially set to zero when a vehicle is shipped in a factory or an engine is assembled in a factory) is set to a new total brush wear amount Abr [mm]. That is, the total brush wear amount Abr is computed based on the following Equation (6).

$$Abr = Abr + \Delta Abr \quad (6)$$

In step S93, the total brush wear amount Abr and the warranty driving wear amount Abr1 are compared. The warranty driving wear amount Abr1 is set to a value at which the starter 11 may not be normally driven due to wear in the brush 21 if the total brush wear amount exceeds that value. The warranty driving wear amount Abr1 is set in advance according to a specification of the starter 11 and the like. If the total brush wear amount Abr is smaller than the warranty driving wear amount Abr1, the process advances to step S5, and the brush deterioration flag is set to zero. If the brush deterioration flag is set to zero, the automatic engine shutdown is allowed.

Meanwhile, if the total brush wear amount Abr is equal to or larger than the warranty driving wear amount Abr1, it is determined that the starter 11 may not be normally driven due to wear in the brush 21, and the process advances to step S6, so that the brush deterioration flag is set to "1." If the brush deterioration flag is set to "1," the automatic engine shutdown is not allowed.

The brush deterioration flag set in this manner is used in the processing of the automatic engine shutdown/restart operation of FIG. 3.

According to the seventh embodiment, the brush wear amount ΔAbr in a single start operation is computed, and the brush wear amount ΔAbr in a single start operation is integrated (added) to compute the total brush wear amount Abr. Then, when this total brush wear amount Abr is equal to or larger than the warranty driving wear amount Abr1 of the starter 11, the brush deterioration flag is set to "1" (automatic engine shutdown is prohibited). As a result, even when the automatic engine shutdown/restart operation is performed using the starter 11 to which electricity is fed through the brush 21, it is possible to reliably perform the automatic engine shutdown/restart operation.

Reference Example

Figure 16:
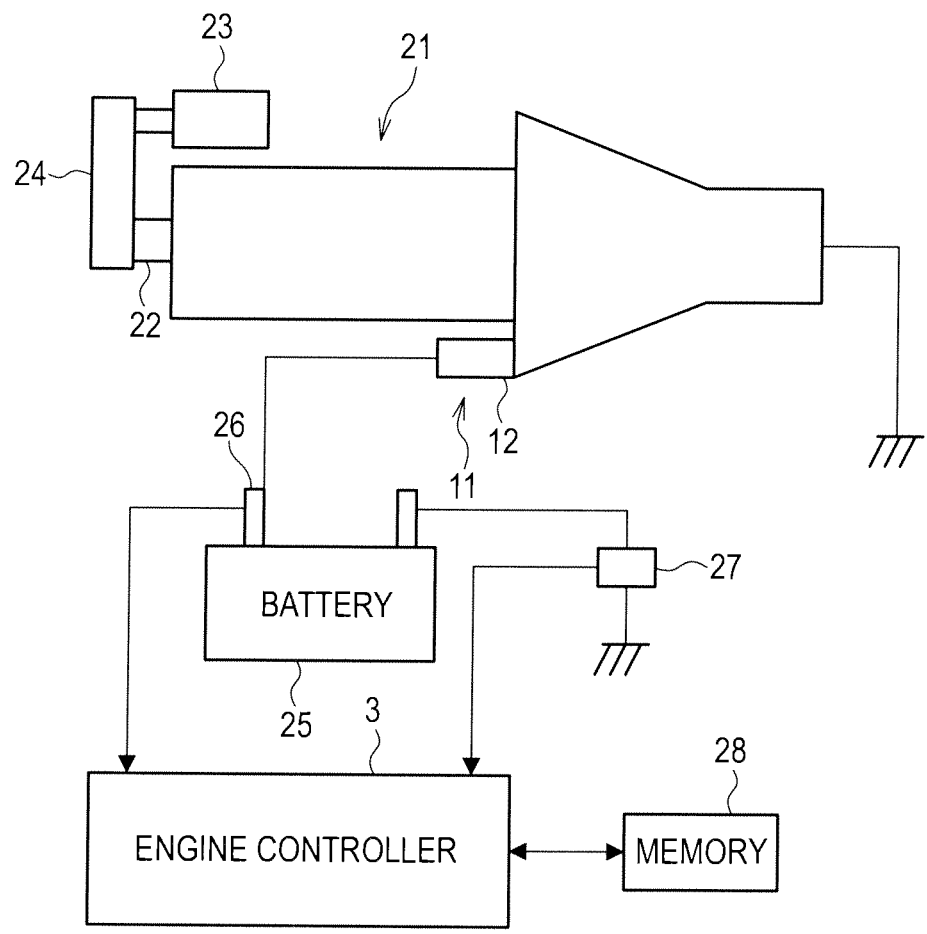
FIG. 16 is a block diagram illustrating a configuration of an idle stop control device according to a reference example.

FIG. 16 is a block diagram illustrating a configuration of an idle stop control device according to a reference example. In FIG. 16, like reference numerals denote like elements as in FIG. 1.

In the fourth embodiment of FIG. 9, the idle stop control device having the single starter 11 is employed. Meanwhile, according to the reference example, an idle stop control device having a pair of starters is employed. In the configuration having a pair of starters, simply to say, a motor/generator 23 driven using a belt 24 is provided in place of an alternator of the related art, and it serves as a second starter in addition to the starter 11 of the related art.

The idle stop control device having a pair of starters will be described with reference to FIG. 16. In the starter 11, in response to the engine start manipulation from a driver, a pinion gear (not illustrated) meshes with a ring gear (not illustrated) of the engine, so that power (rotation) is transmitted from the motor 12 to the crankshaft 22 to start the engine 21.

The motor/generator 23 is connected to the crankshaft 22 of the engine 21 through the belt 24. The motor/generator 23 serves as a generator as a driving source of the engine 21 and also serves as a second starter for starting the engine 21 in the restart operation from the automatic shutdown state of the engine 21.

The motor/generator 23 driven by the belt 24 is provided in place of the alternator of the related art in this manner due to the following reasons. That is, if the automatic engine shutdown/restart operation is repeated only using the starter 11 provided with the motor 12 having the brush 21 illustrated in FIG. 1, wear in the brush 21 is expedited, so that the automatic shutdown/restart operation of the engine 21 using the starter 11 may fail. In this regard, for the automatic engine shutdown/restart operation frequently generated, the motor/generator 23 driven by the belt 24 is used as a second starter. In this case, a brushless motor/generator is employed in the motor/generator 23.

The battery 25 supplies an electric current to the starter 11 and the motor/generator 23. A voltage sensor 26 detects a voltage of the battery 25 and outputs the detected voltage to the engine controller 3. A current sensor 27 detects a charge/discharge current of the battery 25 and outputs the detected charge/discharge current to the engine controller 3.

In a case where such an idle stop control device having a pair of starters 11 and 23 is employed, wear in the brush is generated only in the starter 11.

Figure 17:
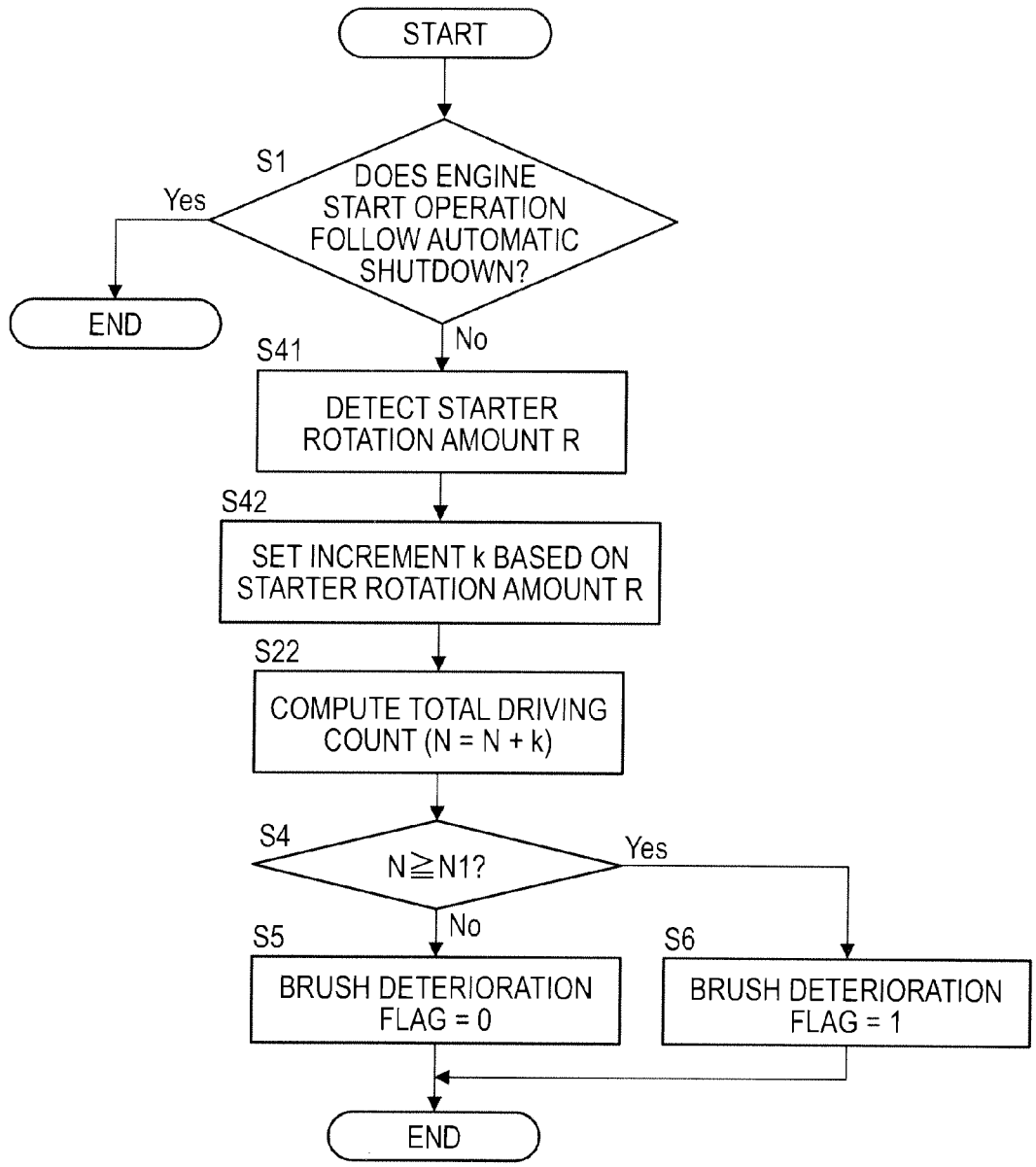
FIG. 17 is a flowchart illustrating setting of the brush deterioration flag according to a reference example.

FIG. 17 is a flowchart illustrating a processing for setting the brush deterioration flag according to the reference example. Since FIG. 17 is similar to FIG. 9 of the fourth embodiment, like reference numerals denote like elements as in FIG. 9.

Description will be made by focusing on the portions different from those of the fourth embodiment. In step S1 of FIG. 17, it is determined whether or not the engine start operation follows the automatic engine shutdown. If the engine start operation follows the automatic engine shutdown, the starter 11 is not used. Therefore, the process is directly terminated.

In a case where the engine start operation does not follow the automatic engine shutdown, that is, if the start operation is performed using the starter 11 (manual start), the process advances to step S41, and the subsequent processing is performed as in the processing of the fourth embodiment to set the brush deterioration flag. The value of the brush deterioration flag is stored in a memory 28 (refer to FIG. 16) such as an electrically erasable programmable ROM (EEPROM) in order to prevent missing even after the driving of the vehicle is terminated.

Figure 18:
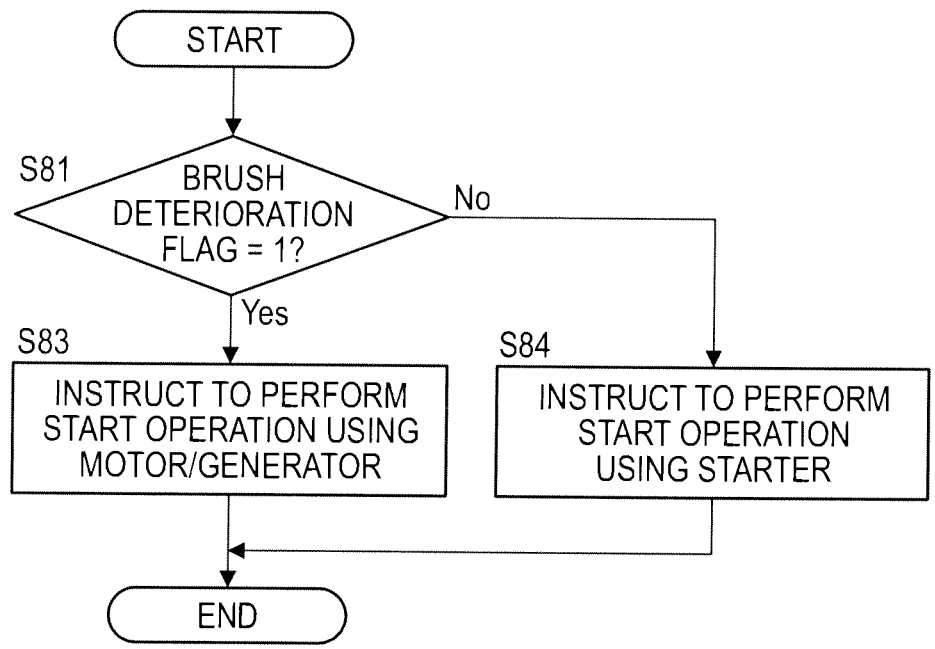
FIG. 18 is a flowchart illustrating the engine start processing according to a reference example.

FIG. 18 is a flowchart illustrating a processing in the engine start operation according to the reference example. The flowchart of FIG. 18 is executed whenever the engine is started to drive a vehicle, that is, whenever the manual start operation is performed. In a relationship with the flowchart of FIG. 17, the processing of FIG. 18 is performed before the processing of the flowchart of FIG. 17. That is, the processing of the flowchart of FIG. 18 is executed immediately after the ignition key switch is turned on. Then, after the engine is started, the processing of the flowchart of FIG. 17 is executed.

In step S81 of FIG. 18, it is determined whether or not the brush deterioration flag is set to "1." The brush deterioration flag is set in the processing of the flowchart of FIG. 17 and is then stored in the memory 28 when the previous vehicle driving is terminated. When the current vehicle driving is started, the value of the brush deterioration flag is read from the memory 28. If the brush deterioration flag is "1," the total starter driving count N in the previous vehicle driving is equal to greater than the warranty driving count N1 of the starter 11. Therefore, it is determined that the starter 11 may not be normally driven due to wear in the brush 21 when the current vehicle driving is started. In this case, since it is difficult to perform the engine start operation using the starter 11, the process advances to step S83, and it is instructed that the engine start operation is performed using the motor/generator 23 as a second starter.

Meanwhile, if the brush deterioration flag is zero in step S81, it is determined that the total starter driving count N in the previous vehicle driving is not equal to or greater than the warranty driving count N1 of the starter 11, and the starter 11 can be driven in the current vehicle driving. In this case, the process advances to step S84, and it is instructed that the engine start operation is performed using the starter 11.

According to the reference example, as a prerequisite, there is provided a configuration having a pair of starters including the starter 11 to which electricity is fed through the brush 21 and the motor/generator 23 driven by the belt 24 as a second starter, and the automatic engine shutdown/restart operation is performed by using the motor/generator 23 as a second starter. In this configuration, the increment k (count equivalent value) is set based on a rotor rotation amount in a single start operation of the starter 11, and a value obtained by integrating this increment k is computed as the total starter driving count N. In a case where the total restart count N of the starter is equal to or greater than the warranty driving count N1 of the starter 11, information representing that the brush 21 is deteriorated is stored even after the current vehicle driving is terminated (the brush deterioration flag is set to "1," and this flag value is stored after the current vehicle driving is terminated). If it is determined, in the next vehicle driving chance, that brush 21 is deteriorated (brush deterioration flag=1) in the previous vehicle driving by referencing the stored information (the value of the brush deterioration flag), the motor/generator 23 is driven as a second starter instead of the starter 11 to start the engine 21. As a result, it is possible to start the engine 21 in the first engine start operation to start the vehicle driving even after the total driving count N of the starter 11 exceeds the warranty driving count N1.

This application claims priority based on JP2011-30469, filed with the Japan Patent Office on Feb. 16, 2011, the entire contents of which are incorporated into this specification by reference.

The invention claimed is:

1. An idle stop control device that automatically shuts down an engine when a first condition is satisfied, and then restarts the engine using a starter to which electricity is led through a brush when a second condition is satisfied, the idle stop control device comprising:
a start-operation brush wear amount computing unit that is configured to compute a brush wear amount in a single start operation;
a total brush wear amount computing unit that is configured to compute a total brush wear amount by integrating the brush wear amount in a single start operation; and
an automatic engine shutdown prohibiting unit that is configured to prohibit an automatic engine shutdown when the total brush wear amount is equal to or larger than the warranty driving wear amount of the starter,
wherein the start-operation brush wear amount computing unit estimates the brush wear amount in a single start operation based on a difference voltage ($\Delta V$) occurring in a battery voltage by applying a voltage to the starter in a single start operation.

2. The idle stop control device according to claim 1, wherein, in a case where the brush wear amount in a single start operation is estimated based on the difference voltage obtained by applying a voltage to the starter in a single start operation, the start-operation brush wear amount computing unit estimates that the brush wear amount in a single start operation increases as the difference voltage increases.

3. An idle stop control device that automatically shuts down an engine when a first condition is satisfied, and then restarts the engine using a starter to which electricity is fed through a brush when a second condition is satisfied, the idle stop control device comprising:
a count equivalent value setting unit that is configured to set a count equivalent value based on a brush wear amount in a single start operation;
a total restart count computing unit that is configured to compute a value obtained by integrating the count equivalent value as a total start count of the starter; and
an automatic engine shutdown prohibiting unit that is configured to prohibit an automatic engine shutdown when the total start count of the starter is equal to or greater than the warranty driving count of the starter,
wherein the count equivalent value setting unit estimates the brush wear amount in a single start operation based on a difference voltage ($\Delta V$) occurring in a battery voltage by applying a voltage to the starter in a single start operation.

4. An idle stop control device that automatically shuts down an engine when a first condition is satisfied, and then restarts the engine using a starter to which electricity is fed through a brush when a second condition is satisfied, the idle stop control device comprising:
a start-operation brush wear amount computing means for computing a brush wear amount in a single start operation;
a total brush wear amount computing means for computing a total brush wear amount by integrating the brush wear amount in a single start operation; and
an automatic engine shutdown prohibiting means for prohibiting an automatic engine shutdown when the total brush wear amount is equal to or larger than the warranty driving wear amount of the starter,
wherein the start-operation brush wear amount computing means estimates the brush wear amount in a single start operation based on a difference voltage ($\Delta V$) occurring in a battery voltage by applying a voltage to the starter in a single start operation.

5. An idle stop control device that automatically shuts down an engine when a first condition is satisfied, and then restarts the engine using a starter to which electricity is fed through a brush when a second condition is satisfied, the idle stop control device comprising:
- a count equivalent value setting means for setting a count equivalent value based on a brush wear amount in a single start operation;
- a total restart count computing means for computing a value obtained by integrating the count equivalent value as a total start count of the starter; and
- an automatic engine shutdown prohibiting means for prohibiting an automatic engine shutdown when the total start count of the starter is equal to or greater than the warranty driving count of the starter,
- wherein the count equivalent value setting means estimates the brush wear amount in a single start operation based on a difference voltage ($\Delta V$) occurring in a battery voltage by applying a voltage to the starter in a single start operation.

* * * * *